(12) United States Patent
Greenebaum et al.

(10) Patent No.: US 10,880,549 B2
(45) Date of Patent: Dec. 29, 2020

(54) SERVER-SIDE ADAPTIVE VIDEO PROCESSING

(71) Applicant: Apple Inc., Cupertino, CA (US)

(72) Inventors: Kenneth I. Greenebaum, San Carlos, CA (US); Haitao Guo, Cupertino, CA (US); Hao Pan, Sunnyvale, CA (US); Guy Cote, San Jose, CA (US); Andrew Bai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/631,398

(22) Filed: Feb. 25, 2015

(65) Prior Publication Data
US 2015/0243243 A1    Aug. 27, 2015

Related U.S. Application Data

(60) Provisional application No. 61/944,484, filed on Feb. 25, 2014, provisional application No. 61/946,638,
(Continued)

(51) Int. Cl.
*G06F 3/14*    (2006.01)
*G09G 5/02*    (2006.01)
(Continued)

(52) U.S. Cl.
CPC ........... *H04N 19/14* (2014.11); *G06F 3/1454* (2013.01); *G06T 5/009* (2013.01); *G09G 3/2007* (2013.01);
(Continued)

(58) Field of Classification Search
None
See application file for complete search history.

(56) References Cited

U.S. PATENT DOCUMENTS

| 5,042,077 A | 8/1991 | Burke |
| 5,357,278 A | 10/1994 | Herz et al. |

(Continued)

FOREIGN PATENT DOCUMENTS

| CN | 101119497 | 2/2008 |
| CN | 101800040 | 8/2010 |

(Continued)

OTHER PUBLICATIONS

International Search Report and Written Opinion from PCT/US2015/017536, dated Jul. 28, 2015, Apple Inc., pp. 1-18.
(Continued)

*Primary Examiner* — Yanna Wu
(74) *Attorney, Agent, or Firm* — Robert C. Kowert; Kowert, Hood, Munyon, Rankin & Goetzel, P.C.

(57) ABSTRACT

Adaptive video processing for a target display panel may be implemented in or by a server/encoding pipeline. The adaptive video processing methods may obtain and take into account video content and display panel-specific information including display characteristics and environmental conditions (e.g., ambient lighting and viewer location) when processing and encoding video content to be streamed to the target display panel in an ambient setting or environment. The server-side adaptive video processing methods may use this information to adjust one or more video processing functions as applied to the video data to generate video content in the color gamut and dynamic range of the target display panel that is adapted to the display panel characteristics and ambient viewing conditions.

25 Claims, 20 Drawing Sheets

Related U.S. Application Data filed on Feb. 28, 2014, provisional application No. 61/946,633, filed on Feb. 28, 2014.

(51) Int. Cl.

| | |
|---|---|
| H04N 1/64 | (2006.01) |
| H04N 19/102 | (2014.01) |
| H04N 19/98 | (2014.01) |
| H04N 21/422 | (2011.01) |
| H04N 21/431 | (2011.01) |
| G09G 5/00 | (2006.01) |
| H04N 19/14 | (2014.01) |
| H04N 19/136 | (2014.01) |
| H04N 19/137 | (2014.01) |
| H04N 19/124 | (2014.01) |
| H04N 19/154 | (2014.01) |
| H04N 19/17 | (2014.01) |
| H04N 19/172 | (2014.01) |
| H04N 19/176 | (2014.01) |
| H04N 19/177 | (2014.01) |
| H04N 19/182 | (2014.01) |
| H04N 19/184 | (2014.01) |
| H04N 19/186 | (2014.01) |
| H04N 19/30 | (2014.01) |
| H04N 19/33 | (2014.01) |
| H04N 19/44 | (2014.01) |
| H04N 19/52 | (2014.01) |
| G06T 5/00 | (2006.01) |
| G09G 3/20 | (2006.01) |
| G09G 5/10 | (2006.01) |
| H04N 1/60 | (2006.01) |
| H04N 5/20 | (2006.01) |
| H04N 5/235 | (2006.01) |
| H04N 5/50 | (2006.01) |
| H04N 9/64 | (2006.01) |
| H04N 9/67 | (2006.01) |
| H04N 21/485 | (2011.01) |
| H04N 19/463 | (2014.01) |
| H04N 19/86 | (2014.01) |
| H04N 21/4223 | (2011.01) |
| H04N 21/44 | (2011.01) |
| H04N 21/4402 | (2011.01) |
| H04N 21/442 | (2011.01) |

(52) U.S. Cl.
CPC ............... *G09G 5/005* (2013.01); *G09G 5/02* (2013.01); *G09G 5/10* (2013.01); *H04N 1/6066* (2013.01); *H04N 1/64* (2013.01); *H04N 5/20* (2013.01); *H04N 5/2355* (2013.01); *H04N 5/505* (2013.01); *H04N 9/641* (2013.01); *H04N 9/67* (2013.01); *H04N 19/102* (2014.11); *H04N 19/124* (2014.11); *H04N 19/136* (2014.11); *H04N 19/137* (2014.11); *H04N 19/154* (2014.11); *H04N 19/17* (2014.11); *H04N 19/172* (2014.11); *H04N 19/176* (2014.11); *H04N 19/177* (2014.11); *H04N 19/182* (2014.11); *H04N 19/184* (2014.11); *H04N 19/186* (2014.11); *H04N 19/30* (2014.11); *H04N 19/33* (2014.11); *H04N 19/44* (2014.11); *H04N 19/52* (2014.11); *H04N 19/98* (2014.11); *H04N 21/42202* (2013.01); *G06T 2207/20208* (2013.01); *G09G 2320/0261* (2013.01); *G09G 2320/0271* (2013.01); *G09G 2320/062* (2013.01); *G09G 2320/066* (2013.01); *G09G 2320/0613* (2013.01); *G09G 2320/0626* (2013.01); *G09G 2320/0666* (2013.01); *G09G 2320/0693* (2013.01); *G09G 2320/08* (2013.01); *G09G 2320/103* (2013.01); *G09G 2340/02* (2013.01); *G09G 2360/144* (2013.01); *G09G 2370/042* (2013.01); *H04N 19/463* (2014.11); *H04N 19/86* (2014.11); *H04N 21/4223* (2013.01); *H04N 21/4402* (2013.01); *H04N 21/44008* (2013.01); *H04N 21/44218* (2013.01); *H04N 21/4854* (2013.01)

(56) References Cited

U.S. PATENT DOCUMENTS

| | | |
|---|---|---|
| 5,815,206 A | 9/1998 | Malladi et al. |
| 6,118,820 A | 9/2000 | Reitmeier et al. |
| 6,141,047 A | 10/2000 | Kawai et al. |
| 6,396,508 B1 | 5/2002 | Noecker |
| 6,560,285 B1 | 5/2003 | Reitmeier et al. |
| 6,762,741 B2 | 7/2004 | Weindorf |
| 6,829,301 B1 | 12/2004 | Tinker et al. |
| 7,508,981 B2 | 3/2009 | Park |
| 7,593,024 B2 | 9/2009 | Andrews et al. |
| 7,730,043 B1 | 6/2010 | Bourdev |
| 8,014,445 B2 | 9/2011 | Segall et al. |
| 8,212,764 B2 | 7/2012 | Song et al. |
| 8,248,486 B1 | 8/2012 | Ward et al. |
| 8,483,479 B2 | 7/2013 | Kunkel et al. |
| 8,625,844 B2 | 1/2014 | Chen |
| 8,773,543 B2 | 7/2014 | Alakarhu et al. |
| 8,866,975 B1 | 10/2014 | Chen et al. |
| 8,888,592 B1* | 11/2014 | Pereira ................... A63F 13/00 463/35 |
| 8,897,377 B2 | 11/2014 | Dougherty, III et al. |
| 9,076,224 B1 | 7/2015 | Shah et al. |
| 9,338,389 B2 | 5/2016 | Messmer |
| 9,384,535 B2 | 7/2016 | Tan et al. |
| 9,451,274 B2 | 9/2016 | Mertens |
| 9,552,652 B2 | 1/2017 | Thoma et al. |
| 9,973,723 B2 | 5/2018 | Guo et al. |
| 10,200,687 B2 | 2/2019 | Guo et al. |
| 10,212,429 B2 | 2/2019 | Guo et al. |
| 10,212,456 B2 | 2/2019 | Guo et al. |
| 2002/0146178 A1 | 10/2002 | Bolle et al. |
| 2002/0164048 A1 | 11/2002 | Bruckstein et al. |
| 2002/0196470 A1 | 12/2002 | Kawamoto et al. |
| 2003/0086595 A1 | 5/2003 | Hu et al. |
| 2003/0103670 A1 | 6/2003 | Schoelkopf et al. |
| 2003/0202589 A1 | 10/2003 | Reitmeier et al. |
| 2003/0228117 A1 | 12/2003 | Truitt et al. |
| 2004/0165253 A1 | 8/2004 | Cathey, Jr. et al. |
| 2004/0213478 A1 | 10/2004 | Chesnokov |
| 2005/0117799 A1 | 6/2005 | Fuh et al. |
| 2005/0219252 A1* | 10/2005 | Buxton ................... G09G 5/363 345/542 |
| 2006/0257050 A1 | 11/2006 | Obrador |
| 2007/0104378 A1 | 5/2007 | Aguera Y Arcas |
| 2007/0223813 A1 | 9/2007 | Segall et al. |
| 2007/0256339 A1 | 11/2007 | Fryer et al. |
| 2008/0137990 A1 | 6/2008 | Ward |
| 2008/0291287 A1 | 11/2008 | Dvir |
| 2008/0316372 A1 | 12/2008 | Xu et al. |
| 2009/0027558 A1 | 1/2009 | Mantiuk et al. |
| 2009/0067506 A1 | 3/2009 | Doser |
| 2009/0079753 A1* | 3/2009 | Alessi ................... G06T 5/009 345/589 |
| 2009/0219387 A1 | 9/2009 | Marman et al. |
| 2009/0244386 A1 | 10/2009 | Norgaard |
| 2010/0157078 A1 | 6/2010 | Atanassov et al. |
| 2010/0172411 A1 | 7/2010 | Efremov et al. |
| 2011/0012937 A1 | 1/2011 | Onishi et al. |
| 2011/0194618 A1* | 8/2011 | Gish ................... G06T 5/50 375/240.25 |
| 2011/0234612 A1 | 9/2011 | Wei et al. |
| 2011/0235720 A1 | 9/2011 | Banterle et al. |
| 2011/0243473 A1 | 10/2011 | Chen et al. |

(56) References Cited

U.S. PATENT DOCUMENTS

| | | |
|---|---|---|
| 2011/0260958 A1 | 10/2011 | Shabel et al. |
| 2011/0292992 A1 | 12/2011 | Sirivara |
| 2011/0316973 A1 | 12/2011 | Miller et al. |
| 2012/0007965 A1 | 1/2012 | Mihara et al. |
| 2012/0047542 A1* | 2/2012 | Lewis ............ H04N 21/44016 725/97 |
| 2012/0051635 A1 | 3/2012 | Kunkel et al. |
| 2012/0081279 A1* | 4/2012 | Greenebaum ............ G09G 5/02 345/156 |
| 2012/0105681 A1 | 5/2012 | Morales |
| 2012/0206470 A1 | 8/2012 | Frank et al. |
| 2012/0314944 A1 | 12/2012 | Ninan et al. |
| 2012/0321273 A1* | 12/2012 | Messmer ............ G11B 27/031 386/224 |
| 2013/0003086 A1 | 1/2013 | Mebane et al. |
| 2013/0044122 A1 | 2/2013 | Ho et al. |
| 2013/0076763 A1 | 3/2013 | Messmer |
| 2013/0076974 A1 | 3/2013 | Atkins |
| 2013/0148029 A1 | 6/2013 | Gish et al. |
| 2013/0177240 A1 | 7/2013 | Thoma et al. |
| 2013/0223531 A1 | 8/2013 | Garbas et al. |
| 2013/0265232 A1 | 10/2013 | Yun et al. |
| 2013/0271779 A1 | 10/2013 | Suzuki |
| 2013/0308027 A1 | 11/2013 | Jenkin |
| 2013/0321671 A1 | 12/2013 | Cote et al. |
| 2013/0328842 A1 | 12/2013 | Barnhoefer et al. |
| 2014/0022460 A1 | 1/2014 | Li et al. |
| 2014/0024453 A1* | 1/2014 | Eberwein ................ A63F 13/06 463/33 |
| 2014/0044372 A1 | 2/2014 | Mertens |
| 2014/0050271 A1 | 2/2014 | Su et al. |
| 2014/0079113 A1 | 3/2014 | Newton et al. |
| 2014/0092012 A1 | 4/2014 | Seshadrinathan et al. |
| 2014/0092108 A1 | 4/2014 | Moon et al. |
| 2014/0198137 A1 | 7/2014 | Feng et al. |
| 2014/0210847 A1 | 7/2014 | Knibbeler et al. |
| 2014/0212062 A1 | 7/2014 | Finlayson |
| 2014/0229875 A1 | 8/2014 | Li et al. |
| 2014/0241418 A1 | 8/2014 | Garbas et al. |
| 2014/0247870 A1 | 9/2014 | Mertens |
| 2014/0254928 A1 | 9/2014 | Tsai et al. |
| 2014/0267822 A1 | 9/2014 | Roffet |
| 2014/0321561 A1 | 10/2014 | Stec et al. |
| 2014/0333673 A1 | 11/2014 | Cho et al. |
| 2014/0340434 A1 | 11/2014 | El-Ghoroury et al. |
| 2014/0341272 A1 | 11/2014 | Miller et al. |
| 2014/0369409 A1 | 12/2014 | Su et al. |
| 2015/0016735 A1 | 1/2015 | Kikuchi |
| 2015/0042890 A1 | 2/2015 | Messmer |
| 2015/0130967 A1 | 5/2015 | Pieper |
| 2015/0201222 A1 | 7/2015 | Mertens |
| 2015/0245004 A1 | 8/2015 | Miller et al. |
| 2015/0245044 A1 | 8/2015 | Guo et al. |
| 2015/0245050 A1 | 8/2015 | Tourapis et al. |
| 2015/0358646 A1 | 12/2015 | Mertens |
| 2016/0156965 A1 | 6/2016 | Oh et al. |
| 2018/0276801 A1 | 9/2018 | Stessen |
| 2018/0352225 A1 | 12/2018 | Guo et al. |
| 2019/0182487 A1 | 6/2019 | Guo et al. |
| 2019/0289305 A1 | 9/2019 | Messmer et al. |

FOREIGN PATENT DOCUMENTS

| | | |
|---|---|---|
| CN | 102422322 | 4/2012 |
| CN | 103262535 | 8/2013 |
| CN | 103563347 | 2/2014 |
| EP | 1827024 | 2/2007 |
| EP | 1827024 | 8/2007 |
| JP | 2002-542739 | 12/2002 |
| JP | 2002542739 | 12/2002 |
| JP | 2008501261 | 1/2008 |
| JP | 2013517723 | 5/2013 |
| JP | 2013-545371 | 12/2013 |
| JP | 2014518030 | 9/2014 |
| KR | 1020010034185 | 4/2001 |
| KR | 10-2013-0084670 | 7/2013 |
| WO | 2007026283 | 3/2007 |
| WO | 2012122425 | 9/2012 |
| WO | WO 2012147022 | 11/2012 |
| WO | 2012166382 | 12/2012 |
| WO | 2012177575 | 12/2012 |
| WO | WO 2013046096 | 4/2013 |
| WO | 2014135901 | 9/2014 |
| WO | 2015007505 | 1/2015 |

OTHER PUBLICATIONS

Bordes Philippe, et al, "Color Gamut Scalable Video Coding for SHVC," 2013 Picture Coding Symposium (PCS), IEEE, Dec. 8, 2013, pp. 301-304.

Sebastien Lasserre, et al., "High Dynamic Range Video Coding," Joint Collaborative Team on Video Coding (JCT-VC), 16th Meeting, Jan. 9-17, 2014, pp. 1-8.

Partial International Search Report from PCT/US2015/017536, dated May 21, 2015, Apple Inc., pp. 1-8.

Bordes Philippe, et al., "Color Gamut Scalable Video Coding for SHVC", 2013 Picture Coding Symposium (PCS), IEEE, Dec. 8, 2013 (Dec. 8, 2013), pp. 301-304.

International Search Report and Written Opinion from PCT/US2015/017539, dated May 20, 2015, Apple Inc., pp. 1-4.

International Written Opinion from PCT/US2015/017539, Dated Feb. 25, 2015, Apple Inc., pp. 1-6.

International Search Report and Written Opinion from PCT/US2015/017540, dated May 15, 2015, Apple Inc., pp. 1-6.

Herbert Thoma: "The adaptive LogLUV transfrom for mapping HOR video to traditional video codecs", 106. MPEG Meeting; Oct. 28, 2013-Nov. 1, 2013; Geneva; (Motion Picture Expert Group or ISO/IEC JTC1/SC29/WG11 ), No. M31308, Oct. 23, 2013, XP030059761, pp. 1-6.

Jens-Uwe Garbas et al: "Temporally coherent luminance-to-luma mapping for high dynamic range video coding with H.264/AVC", IEEE International Conference on Acoustics, Speech and Signal Processing, May 22, 2011, pp. 829-832.

Lauga Paul et al: "Segmentation-based optimized tone mapping for high dynamic range image and video coding", Picture Coding Symposium, Dec. 8, 2013, pp. 257-260.

Lasserre S et al: "High Dynamic Range video coding", 16. JCT-VG Meeting; Jan. 9, 2014-Jan. 17, 2014; San Jose; (Joint Collaborative Team on Video Coding of ISO/IEC JTC1/SC29/WG11 and ITU-T SG. 16 ); URL: http://wftp3.itu.int/av-arch/jctvc-site/, No. JCTVC-P0159, Jan. 5, 2014, pp. 1-9.

Fogg (Harmonic) C et al: "Indication of SMPTE 2084, 2085 and carriage of 2086 metadata in HEVC", 16. JCT-VC Meeting, Jan. 9, 2014-Jan. 17, 2014, http://wftp3.itu.int/av-arch/jctvc-site/, No. JCTVC-P0084-v2, pp. 1-5.

Segall A et al: "Tone mapping SEI Message", 19. JVT Meeting; Mar. 31, 2006-Apr. 7, 2006; Geneva, CH; (Joint Videoteam of ISO/IEC/JTC1/SC29/WG11 and ITU-T SG:16 ), No. JVT-5087, Apr. 1, 2006, pp. 1-12.

Yasir Salih et al: "Tone mapping of HDR images: A review", IEEE International Conference on Intelligent and Advanced Systems, Jun. 12, 2012, pp. 368-373.

Boyce J et al: "High level syntax hooks for future extensions", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-H0388, Jan. 21, 2012, pp. 1-8.

International Written Opinion from PCT/US2015/017540, Dated Feb. 25, 2014, Apple, pp. 1-13.

U.S. Appl. No. 14/631,401, filed Feb. 25, 2015, Haitao Guo.
U.S. Appl. No. 14/631,394, filed Feb. 25, 2015, Kenneth I. Greenebaum.
U.S. Appl. No. 14/631,410, filed Feb. 25, 2015, Alexandros Tourapis.
U.S. Appl. No. 14/631,405, filed Feb. 25, 2015, Hao Pan.
Office Action from Australian Application No. 2015223123, Dated Jul. 27, 2017, Apple Inc., pp. 1-7.

(56) References Cited

OTHER PUBLICATIONS

Ajit Motra, et al., "An Adaptive LogLuv Transform for High Dynamic Range Video Compression", Proceeding of 2010 IEEE 17th International Conference on Image Processing, Sep. 26-29, 2010, pp. 2061-2064.
Office Action from Japanese Application No. 2016/548661, Dated Oct. 6, 2017, Apple Inc., pp. 1-8.
Pavel Kosenko, "How to use curves", Retrieved from URL: https://pavelkosenko.wordpress.com/2012/04/01/how-to-use-curves/, pp. 1-27.
Office Action from Chinese Application No. 201580010095.8, (English Translation, Chinese Version), Apple Inc., dated Dec. 3, 2018, pp. 1-21.
Office Action from Korean Application No. 10-2018-7025884, Apple Inc., dated Oct. 2, 2018, pp. 1-10.
Office Action from Chinese Application No. 201580010103.9, (English Translation and Chinese Version) dated Apr. 26, 2019, pp. 1-13.
Office Action from Korean Application No. 10-2018-7025884, (Korean Version), dated Jun. 24, 2019, pp. 1-2.
Jens-Uwe Garbas et al, "Temporally Coherent Luminance-To-Lum-a Mapping for High Dynamic Range Video Coding with H. 264/AVC", dated Jul. 12, 2011, pp. 1-5.
Office Action from Japanese Application No. 2018146796, dated Aug. 9, 2019, pp. 1-4.
Larson, "Overcoming Gamut and Dynamic Range Limitations in Digital Images," Color Imaging Conference, 1998.
Mantiuk, "High Dynamic Range Imaging: Towards the Limits of the Human Visual Perception," Forschung and wissenschaftliches Rechnen, 2006, 72:11-27.
Wikipedia.org [online], "High-dynamic-range imaging," last revised Feb. 17, 2020, retrieved on Mar. 5, 2020, retrieved from URL<https://en.wikipedia.org/w/index.php?ritle=High-dynamic- range_imaging &oldid=595943247;>, 12 pages.

\* cited by examiner

SERVER-SIDE ADAPTIVE VIDEO PROCESSING

PRIORITY INFORMATION

This application claims benefit of priority of U.S. Provisional Application Ser. No. 61/944,484 entitled "DISPLAY PROCESSING METHODS AND APPARATUS" filed Feb. 25, 2014, the content of which is incorporated by reference herein in its entirety, to U.S. Provisional Application Ser. No. 61/946,638 entitled "DISPLAY PROCESSING METHODS AND APPARATUS" filed Feb. 28, 2014, the content of which is incorporated by reference herein in its entirety, and to U.S. Provisional Application Ser. No. 61/946,633 entitled "ADAPTIVE METHODS AND APPARATUS" filed Feb. 28, 2014, the content of which is incorporated by reference herein in its entirety.

BACKGROUND

Technical Field

This disclosure relates generally to digital video or image processing and display.

Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement video processing method(s). For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources according to one or more video processing methods and output the processed video frames to one or more destinations.

As an example, a video encoder may be implemented as an apparatus, or alternatively as a software program, in which digital video input is encoded or converted into another format according to a video encoding method, for example a compressed video format such as H.264/Advanced Video Coding (AVC) format, or H.265 High Efficiency Video Coding (HEVC) format. As another example, a video decoder may be implemented as an apparatus, or alternatively as a software program, in which video in a compressed video format such as AVC or HEVC is received and decoded or converted into another (decompressed) format according to a video decoding method, for example a display format used by a display device. The H.264/AVC standard is published by ITU-T in a document titled "ITU-T Recommendation H.264: Advanced video coding for generic audiovisual services". The H.265/HEVC standard is published by ITU-T in a document titled "ITU-T Recommendation H.265: High Efficiency Video Coding".

In many systems, an apparatus or software program may implement both a video encoder component and a video decoder component; such an apparatus or program is commonly referred to as a codec. Note that a codec may encode/decode both visual/image data and audio/sound data in a video stream.

In digital image and video processing, conventionally, digital images (e.g., video or still images) are captured, rendered, and displayed at a limited dynamic range, referred to as standard dynamic range (SDR) imaging. In addition, images are conventionally rendered for display using a relatively narrow color gamut, referred to as standard color gamut (SCG) imaging. Extended or high dynamic range (HDR) imaging refers to technology and techniques that produce a wider range of luminance in electronic images (e.g., as displayed on display screens or devices) than is obtained using standard digital imaging technology and techniques (referred to as standard dynamic range, or SDR, imaging). Many new devices such as image sensors and displays support HDR imaging as well as wide color gamut (WCG) imaging. These devices may be referred to as HDR-enabled devices or simply HDR devices.

SUMMARY OF EMBODIMENTS

Various embodiments of methods and apparatus for adaptive processing, rendering, and display of digital image content, for example video frames or video streams, are described. Embodiments of video processing methods and apparatus are described that may adaptively render video data for display to a target display panel. The adaptive video processing methods may take into account various information including but not limited to video content, display characteristics, and environmental conditions including but not limited to ambient lighting and viewer location with respect to the display panel when processing and rendering video content for a target display panel in an ambient setting or environment. The adaptive video processing methods may use this information to adjust one or more video processing functions (e.g., noise/artifacts reduction, scaling, sharpening, tone mapping, color gamut mapping, frame rate conversion, color correction, white point and/or black point correction, color balance, etc.) as applied to the video data to render video for the target display panel that is adapted to the display panel according to the ambient environmental or viewing conditions.

In some embodiments, adaptive video processing for a target display panel may be implemented in or by a server/encoding pipeline. These embodiments may be referred to as server-side adaptive video processing systems. In at least some embodiments, a server/encoding pipeline may obtain video content for a target display panel. The target display panel may support high dynamic range (HDR) and wide color gamut (WCG) imaging. The server/encoding pipeline may obtain or determine one or more characteristics of the input video content. The server/encoding pipeline may obtain display information and/or environment information for the target display panel, for example from a system on which the target display panel is implemented. The display information may indicate display characteristics that may include one or more of, but are not limited to, measured response, format, resolution, size, dynamic range, bit depth, backlight level(s), white point, black leakage, reflectivity, local contrast enhancement or mapping, current display control settings, and so on. The environment information may include, but is not limited to, various ambient lighting metrics and viewer metrics such as viewer location relative to the target display panel.

The server/encoding pipeline may map the video content to a color gamut of the target display panel according to a color gamut mapping technique. The color gamut mapping technique may be selected, modified, or adjusted according to the obtained information. For example, the color gamut of the source data may be mapped to the bit depth and color gamut of the target display panel according to the display information. As another example, curves, transfer functions, and/or lookup tables used in the gamut mapping technique may be modified or adjusted based upon one or more metrics including but not limited to current ambient lighting metrics at the display panel as indicated by the environment information.

The server/encoding pipeline may map the video content to a dynamic range for the target display panel according to a tone mapping technique. The tone mapping technique may be adjusted according to the obtained information. For example, the dynamic range of the source data may be mapped to the bit depth of the target display panel according to the display information. As another example, tone curves and/or transfer functions used in the tone mapping technique may be modified or adjusted based upon one or more metrics including but not limited to current ambient lighting metrics at the display panel as indicated by the environment information. In some embodiments, instead of or in addition to a global tone curve, the video frames may be subdivided into multiple regions, and local tone curves may be dynamically selected for each region based at least in part upon the display and/or environment information.

The server/encoding pipeline may encode the video content and send the encoded video content to a decoding/display pipeline associated with the target display panel. The decoding/display pipeline decodes and displays the video content. Since display panel-specific tone and color gamut mapping to the dynamic range and color gamut supported by the target display panel is performed on the server/encoding side, the decoding/display pipeline may not require any changes or modifications to support HDR and/or WCG imaging.

Figure 1:
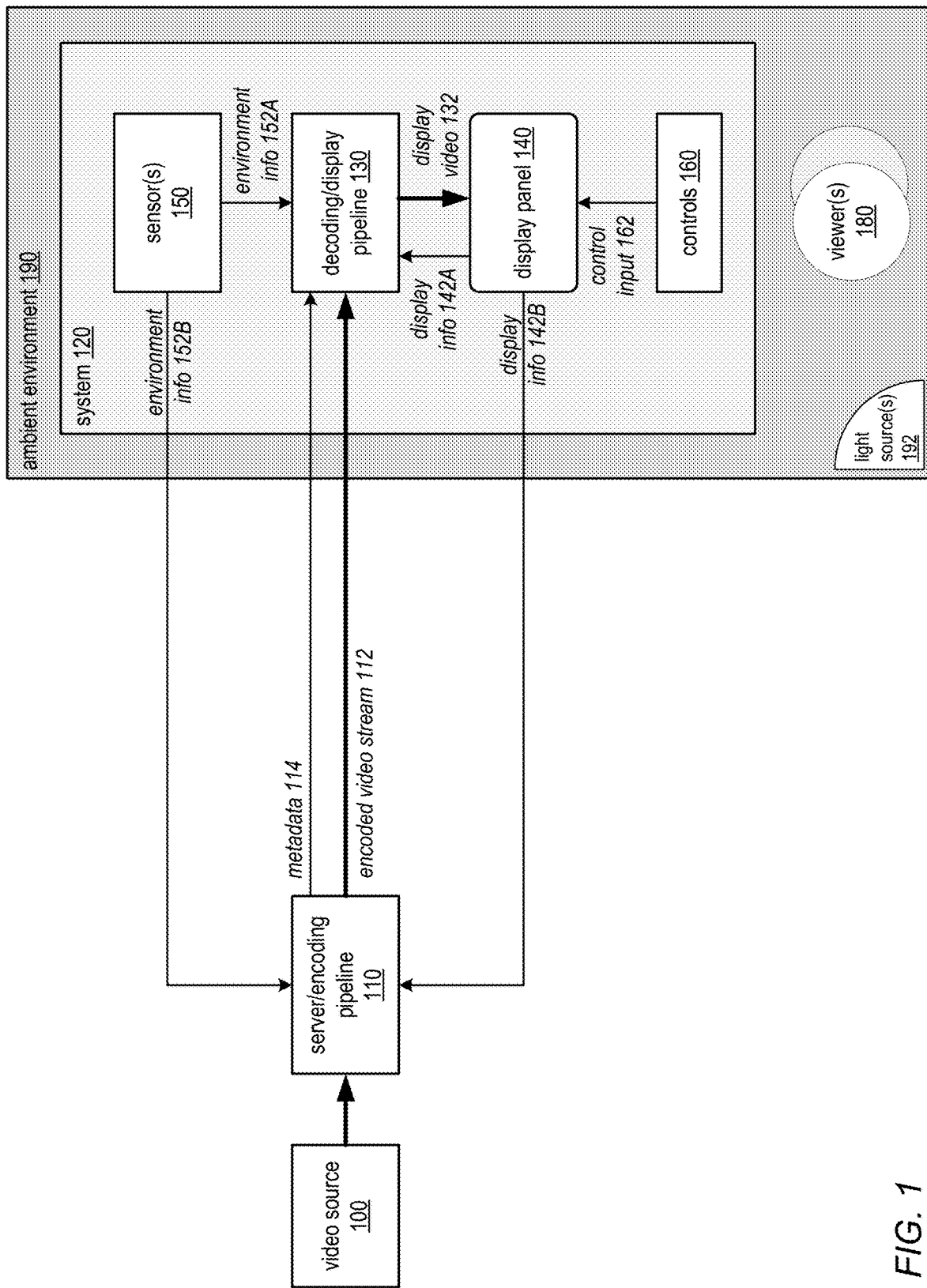
FIG. 1 illustrates adaptive video processing in a video playback system, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

Various embodiments of methods and apparatus for adaptive processing, rendering, and display of digital image content, for example video frames or video streams, are described. Embodiments of video processing methods and apparatus are described that may adaptively render video data for display to a target display panel. The adaptive video processing methods may take into account various information including but not limited to video content, display characteristics, and environmental conditions including but not limited to ambient lighting and viewer location with respect to the display panel when processing and rendering video content for a target display panel in an ambient setting or environment. The adaptive video processing methods may use this information to adjust one or more video processing functions (e.g., noise/artifacts reduction, scaling, sharpening, tone mapping, color gamut mapping, frame rate conversion, color correction, white point and/or black point correction, color balance, etc.) as applied to the video data to render video for the target display panel that is adapted to the display panel according to the ambient viewing conditions.

Conventionally, video processing algorithms have been designed for standard dynamic range (SDR) imaging. With the emergence of high dynamic range (HDR) imaging techniques, systems and displays, a need for video processing techniques targeted at HDR imaging has emerged. For HDR video processing, there may be certain things that need to be done differently than with SDR video processing. For example, HDR video may require more aggressive noise reduction, may have more visible judder, and may require different sharpness and detail enhancement than SDR video. Thus, embodiments of the adaptive video processing methods and apparatus as described herein that may implement video processing techniques that are targeted at HDR imaging. In addition, embodiments may also support wide color gamut (WCG) imaging.

Generally defined, dynamic range is the ratio between the largest and smallest possible values of a changeable quantity, such as in signals like sound and light. In digital image processing, a high dynamic range (HDR) image is an image that is produced using an HDR imaging technique that produces a wider range of luminosity than is obtained using standard digital imaging techniques. For example, an HDR image may include more bits per channel (e.g., 10, 12, 14, or more bits per luma and chroma channel), or more bits for luminosity (the luma channel), than are used in conventional image processing (typically, 8 bits per channel, e.g. 8 bits for color/chroma and for luma). An image produced using standard digital imaging techniques may be referred to as having a standard dynamic range (SDR), and typically uses 8 bits per channel. Generally defined, tone mapping is a technique that maps one set of tonal image values (e.g., luma values from HDR image data) to another (e.g., to SDR image data). Tone mapping may be used, for example, to approximate the appearance of HDR images in a medium that has a more limited dynamic range (e.g., SDR). Tone mapping may generally be applied to luma image data.

In some embodiments of the video processing methods and apparatus as described herein, a global tone mapping (GTM) technique may be used in converting video content from one dynamic range to another. In a GTM technique, a global tone curve may be specified or determined for one or more video frames and used in converting video content from one dynamic range to another. In some embodiments, instead of or in addition to a GTM technique, a local tone mapping (LTM) technique may be used in converting video content from one dynamic range to another. In an LTM technique, an image or frame is divided into multiple regions, with a tone curve specified or determined for each region.

Generally defined, color gamut refers to a particular subset of colors, for example the subset of colors which can be accurately represented in a given circumstance, such as within a given color space (e.g., an RGB color space) or by a display device. Color gamut may also refer to the complete set of colors found within an image. A color gamut mapping technique may be used, for example, to convert the colors as represented in one color space to a color gamut used in another color space. A color gamut mapping technique (which may also be referred to as color or chroma mapping) may be applied to image data (generally to chroma image data), and may in some cases narrow or clip an image's color gamut, or alternatively may be used to correct or adjust the color gamut or range of an image during or after tone mapping.

In photometry, the SI unit for luminance is candela per square meter ($cd/m^2$). Candela is the SI unit of luminous intensity. A non-SI term for the same unit is "NIT". The lux is the SI unit of illuminance and luminous emittance, measuring luminous flux (lumens) per unit area. The lux is equal to one lumen per square meter. The lumen is the SI derived unit of luminous flux, a measure of visible light emitted by a source.

Adaptive Video Processing Systems

FIG. 1 illustrates adaptive video processing in an example video playback system, according to some embodiments. Embodiments of the adaptive video processing methods and apparatus may, for example, be implemented in video playback systems that include a server/encoding module or pipeline 110 and a decoding/display module or pipeline 130. The server/encoding pipeline 110 and decoding/display pipeline 130 may be implemented in the same device, or may be implemented in different devices. The server/encoding pipeline 110 may be implemented in a device or system that includes at least one video source 100 such as a video camera or cameras. The decoding/display pipeline 130 may be implemented in a device or system 120 that includes a target display panel 140 and that is located in an ambient environment 190. One or more human viewers 180 may be located in the ambient environment 190. The system 120 may include or may implement one or more controls 160 for the display panel 140, for example brightness and contrast controls. The system 120 may also include one or more sensors 150 such as light sensors or cameras. The ambient environment 190 may, for example, be a room (bedroom, den, etc.) in a house, an outdoor setting, an office or conference room in an office building, or in general any environment in which a system 120 with a display panel 140 may be present. The ambient environment 190 may include one or more light sources 192 such as lamps or ceiling lights, other artificial light sources, windows, and the sun in outdoor environments. Note that a system 120 and/or display panel may be moved or repositioned within an ambient environment 190, or moved from one ambient environment 190 (e.g., a room) to another (e.g., another room or an outdoor environment).

In at least some embodiments, the server/encoding pipeline 110 may receive input video from a video source 100 (e.g., from a video camera on a device or system that includes server/encoding pipeline 110), convert the input video into another format according to a video encoding method, for example a compressed video format such as H.264/Advanced Video Coding (AVC) format, or H.265 High Efficiency Video Coding (HEVC) format, and stream 112 the encoded video to a decoding/display pipeline 130. The decoding/display pipeline 130 may receive and decode the encoded video stream 112 to generate display video 132 for display on the display panel 140. In some embodiments, metadata 114 describing the encoding may also be provided by the server/encoding pipeline 110 to the decoding/display pipeline 130. For example, the metadata may include information describing gamut mapping and/or tone mapping operations performed on the video content. In some embodiments, the metadata 114 may be used by the decoding/display pipeline 130 in processing the input video stream 112 to generate the output display video 132 content.

A video playback system as illustrated in FIG. 1 may implement one or more adaptive video processing methods and apparatus as described herein that may take into account various information including but not limited to video content, display information 142 (e.g., display panel 140 characteristics, control input 162, backlight levels, etc.), and environmental information 152 (e.g., ambient lighting 192, viewer 180 location, etc.) when processing and rendering video content for a target display panel 140 in an ambient setting or environment 190. The adaptive video processing methods and apparatus may use this information, obtained from sensor(s) 150, display panel 140, or from other sources, to adjust one or more video processing functions (e.g., noise/artifacts reduction, scaling, sharpening, tone mapping, color gamut mapping, frame rate conversion, color correction, white point and/or black point correction, color balance, etc.) as applied to the video data to render video for the target display panel 140 that is adapted to characteristics of the display panel 140 and to ambient viewing conditions in environment 190.

In some embodiments, adaptive video processing for a target display panel 140 may be implemented in or by a decoding/display pipeline 130. These embodiments may be referred to as display-side adaptive video processing systems. In some embodiments, adaptive video processing for a target display panel 140 may be implemented in or by a server/encoding pipeline 110. These embodiments may be referred to as server-side adaptive video processing systems. In some embodiments, some adaptive video processing functionality may be performed by the server/encoding pipeline 110 prior to streaming the encoded video to the decoding/display pipeline 130, with additional adaptive video processing being performed by the decoding/display pipeline 130.

Embodiments of the adaptive video processing methods and apparatus including but not limited to server/encoding pipeline 110 components and decoding/display pipeline 130 components as described herein may, for example, be implemented in devices or systems that include one or more image capture devices and/or one or more display devices.

An image capture device may be any device that includes an optical sensor or photosensor that is capable of capturing digital images or video. Image capture devices may include, but are not limited to, video cameras and still image cameras, as well as image capture devices that can capture both video and single images. Image capture devices may be stand-alone devices or may be cameras that are integrated into other devices including but not limited to smartphones, cellphones, PDAs, tablet or pad devices, multifunction devices, computing devices, laptop computers, notebook computers, netbook computers, desktop computers, and so on. Note that image capture devices may include small form factor cameras suitable for use in small devices such as cellphones, PDAs, and tablet devices. FIGS. 15 through 19 show non-limiting examples of devices that may include image capture devices or cameras as described herein.

Displays or display devices may include display screens or panels that are integrated into other devices including but not limited to smartphones, cellphones, PDAs, tablet or pad devices, multifunction devices, computing devices, laptop computers, notebook computers, netbook computers, desktop computers, and so on. Display devices may also include video monitors, projectors, or in general any device that can display or project digital images and/or digital video. The displays or display devices may use LCD (liquid crystal display) technology, LPD (light emitting polymer display) technology, or LED (light emitting diode) technology, although other display technologies may be used.

Embodiments of the adaptive video processing methods and apparatus are generally described as supporting capture, processing, encoding, distribution, and display of HDR video data to HDR-enabled display devices. In addition, embodiments may also support wide color gamut (WCG) imaging. However, embodiments of adaptive video processing methods and apparatus as described herein may also be used with display devices that do not support HDR imaging. In addition, some embodiments may support display of standard dynamic range (SDR) video data to one or both of HDR-enabled display devices and display devices that do not support HDR imaging.

Embodiments of the adaptive video processing methods and apparatus are generally described herein as processing video frames or sequences. However, embodiments may be applied to process single or still images instead of or in addition to video frames or sequences, as well as other digital images. Thus, when "video", "video frame", "frame", or the like is used herein, it is to be understood that the terms may refer to digital images in general.

Figure 15:
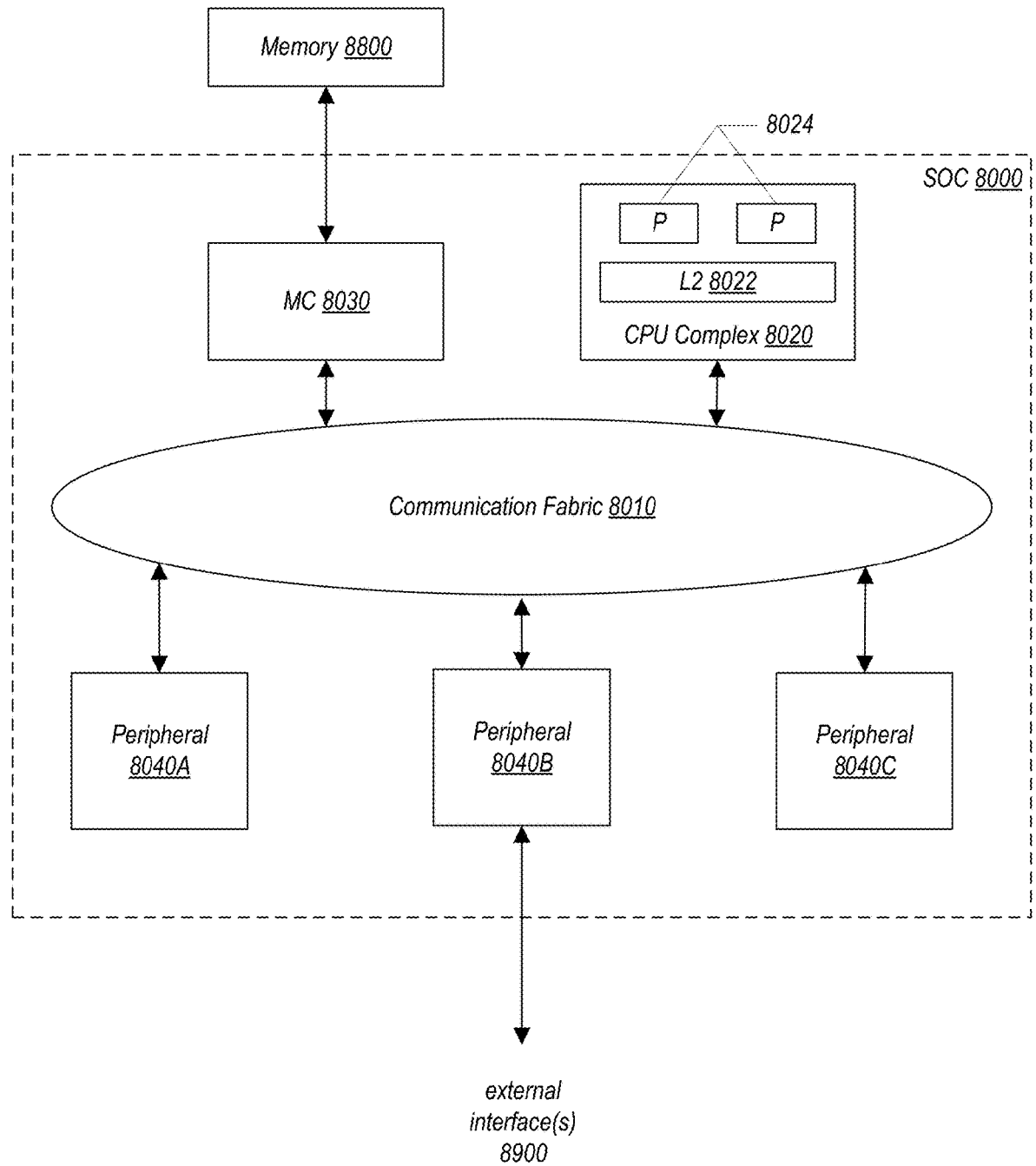
FIG. 15 is a block diagram of one embodiment of a system on a chip (SOC) that may be configured to implement aspects of the systems and methods described herein.
Figure 16:
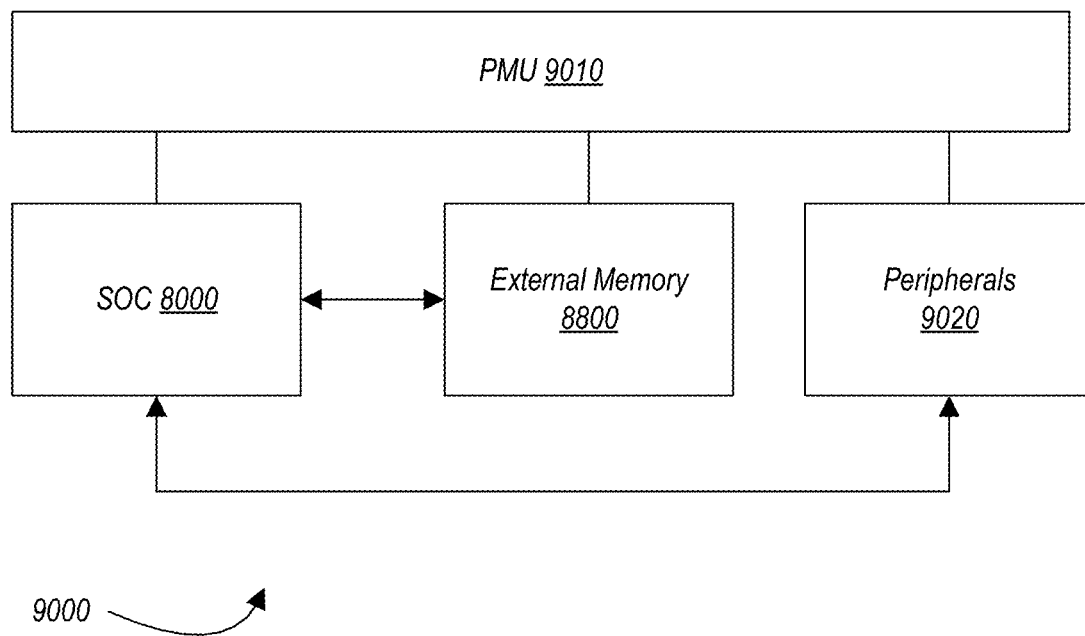
FIG. 16 is a block diagram of one embodiment of a system that may include one or more SOCs.
Figure 17:
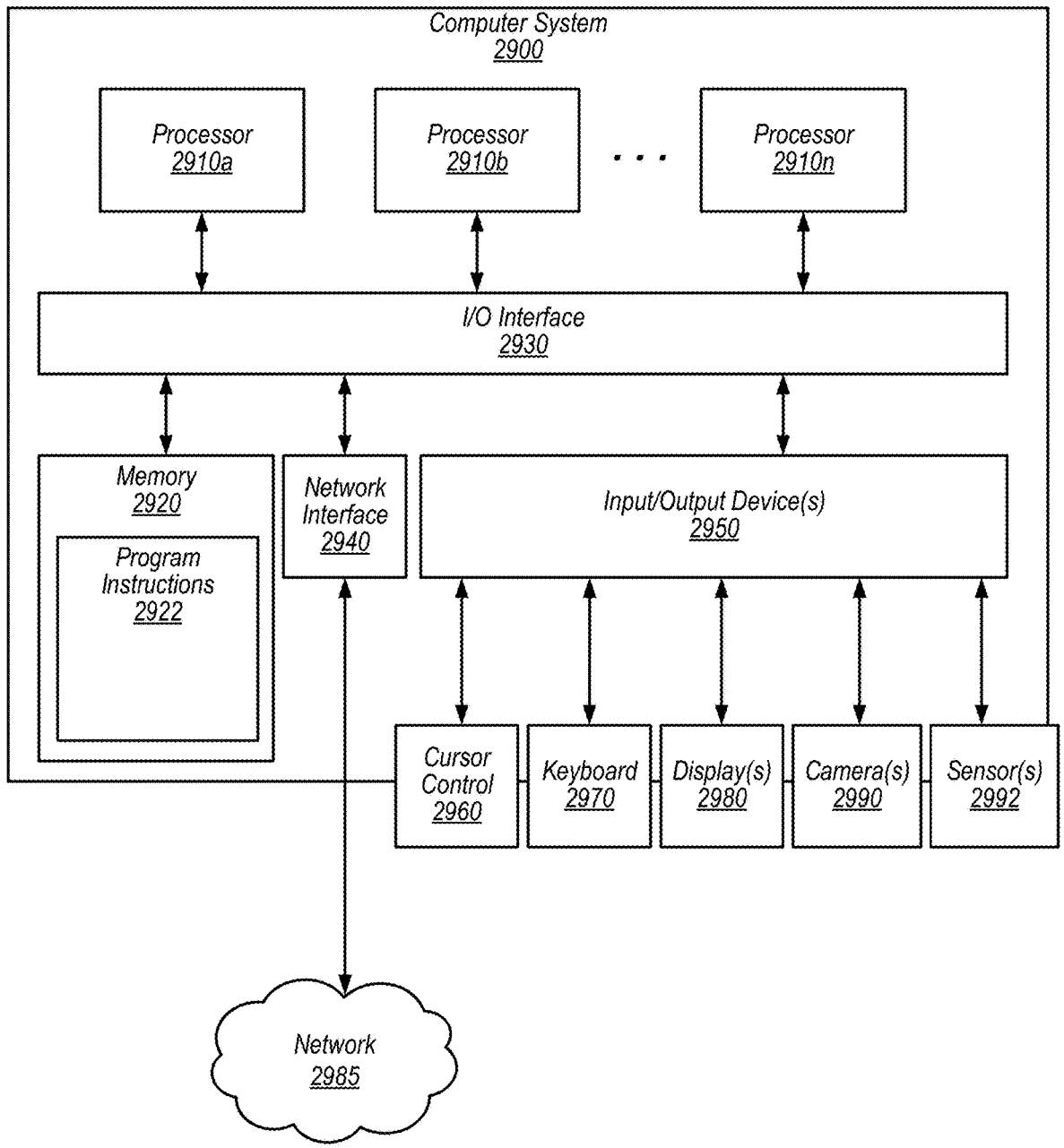
FIG. 17 illustrates an example computer system that may be configured to implement aspects of the systems and methods described herein, according to some embodiments.
Figure 18:
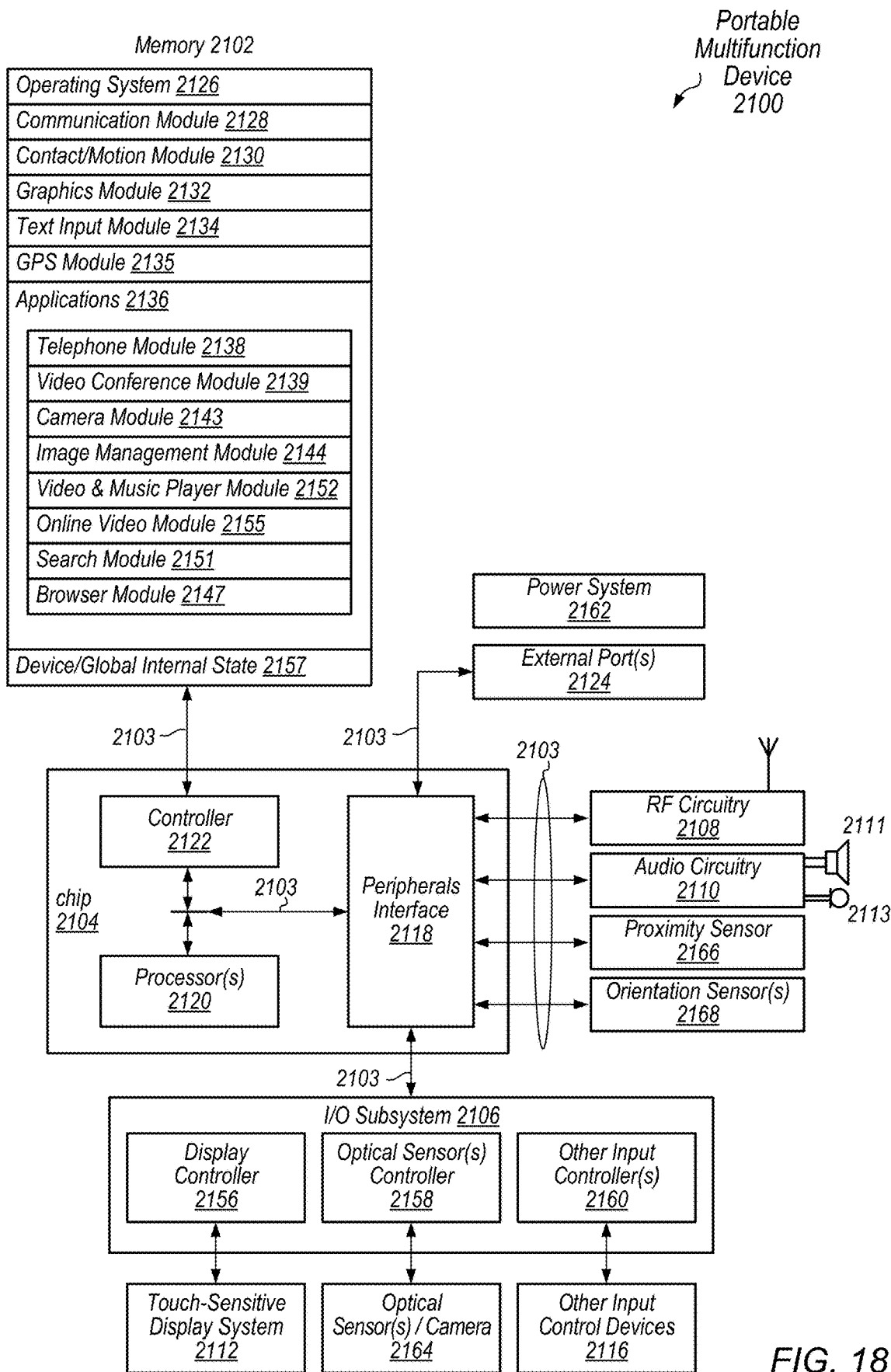
FIG. 18 illustrates a block diagram of a portable multifunction device in accordance with some embodiments.
Figure 19:
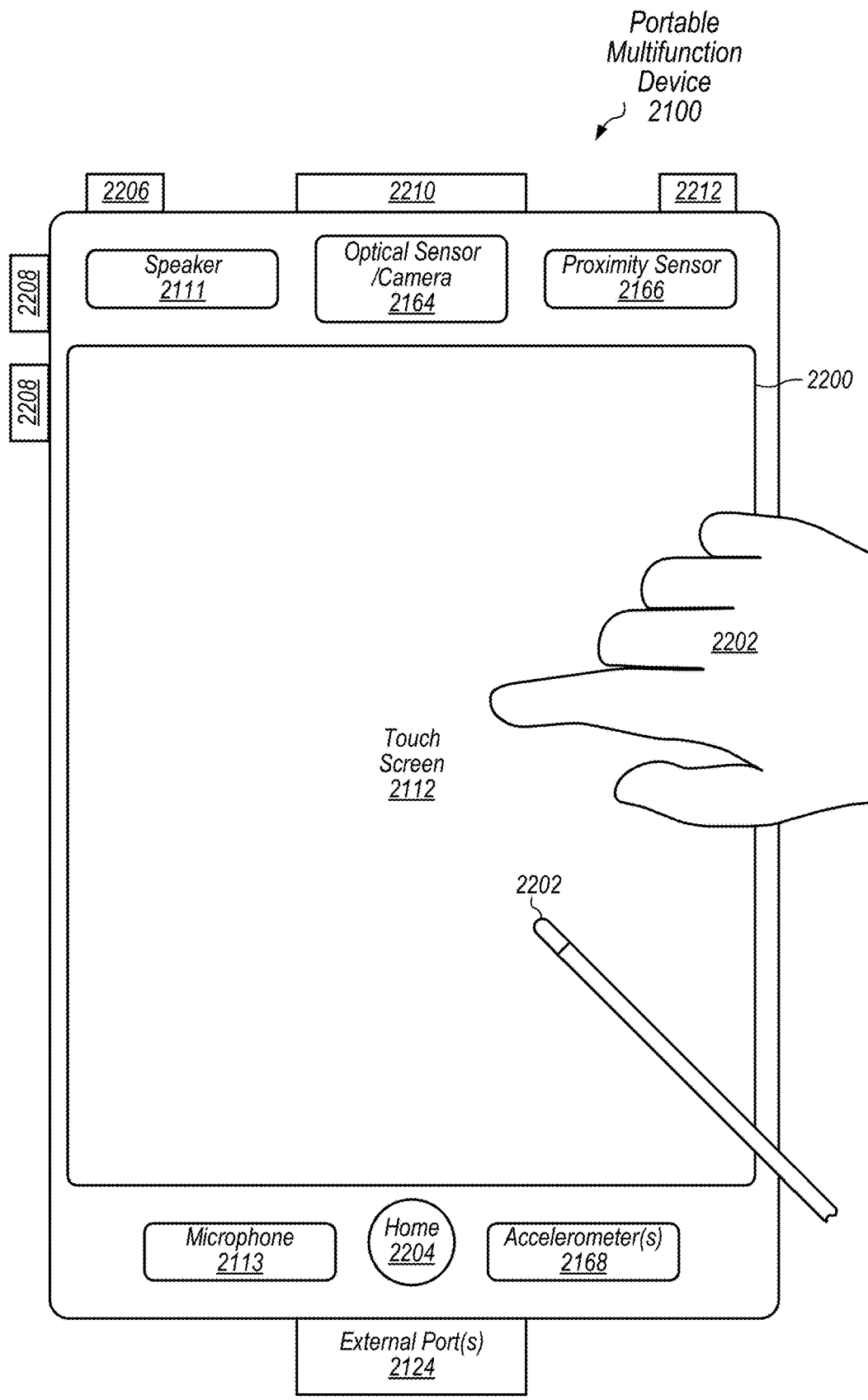
FIG. 19 depicts a portable multifunction device in accordance with some embodiments.

FIGS. 15 through 19 show non-limiting examples of devices in which embodiments of the adaptive video processing methods and apparatus may be implemented. A device or system that includes an image capture device and/or a display device may include hardware and/or software that implements at least some of the functionality for processing video data as described herein. In some embodiments, a portion of the functionality as described herein may be implemented on one device, while another portion may be implemented on another device. For example, in some embodiments, a device that includes an image capture device may implement a sensor pipeline that processes and compresses (i.e., encodes) images or video captured via a photosensor, while another device that includes a display panel or screen may implement a display pipeline that receives and processes the compressed images (i.e., decodes) for display to the display panel or screen. In some embodiments, at least some of the functionality as described herein may be implemented by one or more components or modules of a system on a chip (SOC) that may be used in devices including but not limited to multifunction devices, smartphones, pad or tablet devices, and other portable computing devices such as laptop, notebook, and netbook computers. FIG. 15 illustrates an example SOC, and FIG. 16 illustrates an example device implementing an SOC. FIG. 17 illustrates an example computer system that may implement the methods and apparatus described herein. FIGS. 18 and 19 illustrate example multifunction devices that may implement the methods and apparatus described herein.

Display-Side Adaptive Video Processing

Referring again to FIG. 1, in some embodiments, adaptive video processing for a target display panel 140 may be implemented in or by a decoding/display pipeline 130. These embodiments may be referred to as display-side adaptive video processing systems. The decoding/display pipeline 130 may, for example, be implemented in a device or system 120 that includes a target display panel 140 and that is located in an ambient environment 190.

Figure 5:
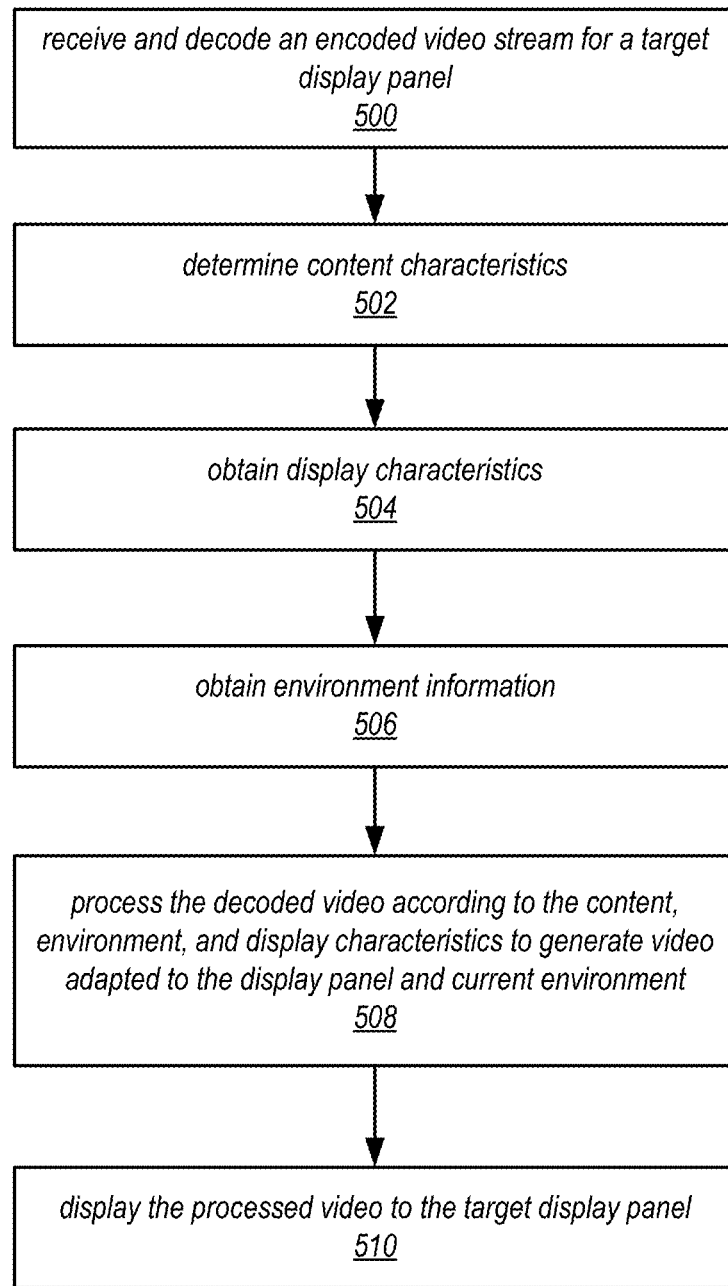
FIG. 5 is a flowchart of a method for adaptive video processing in a decoding/display pipeline, according to some embodiments.

FIG. 5 is a flowchart of a method for display-side adaptive video processing in a decoding/display pipeline, according to some embodiments. As indicated at 500 of FIG. 5, a decoding/display pipeline may receive and decode an encoded video stream for a target display panel. For example, encoded HDR video data may be received by the decoding/display pipeline from a server/encoding pipeline; the target display panel may be an HDR-enabled display device. The video data may, for example, be encoded according to a compressed video format such as an H.264/AVC or H.265/HEVC format. A decoder component of the decoding/display pipeline may decode the encoded video to generate decoded, HDR video content.

As indicated at 502 of FIG. 5, one or more characteristics of the decoded video content may be determined. For example, in some embodiments, the decoded video content may be analyzed to determine intra-frame and/or inter-frame characteristics of the video, for example luminance characteristics (e.g., dynamic range), color characteristics (e.g., color range), inter-frame motion, specular highlights, contrast, bright and dark regions, and so on.

As indicated at 504 of FIG. 5, one or more display characteristics may be obtained for the target display panel. The display characteristics may include one or more of, but are not limited to, measured response, display format, display dynamic range, bit depth, backlight level(s), white point, black leakage, reflectivity, local contrast enhancement or mapping, current display control settings, and so on.

As indicated at 506 of FIG. 5, environment information may be obtained. For example, in some embodiments, a device that includes the display panel may include one or more forward- and/or backward-facing sensors (e.g., cameras, light sensors, etc.) that may be used to collect data from the ambient environment; the collected data may be analyzed to determine one or more environment metrics. The environment metrics may include, but are not limited to, various ambient lighting metrics and viewer metrics such as viewer location relative to the display panel, size of the display panel, and distance to the display panel. The ambient lighting metrics may, for example, include metrics about light striking the display panel, reflective light levels from the display panel, and metrics (e.g., brightness, color, white point, etc.) of the field of view (or background) that the viewer/user is facing.

As indicated at 508 of FIG. 5, the decoding/display pipeline may process the decoded video according to the content, display characteristics, and current environment information to generate video adapted to the display panel and the current environment. In some embodiments, based on the content characteristics, display characteristics, and environment metrics, one or more video processing functions of the decoding/display pipeline (for example, noise/artifacts reduction, scaling and sharpening, frame rate conversion, display management, gamut and tone mapping, and so on) may be adjusted to adapt the decoded HDR video content for display on the target display panel. As indicated at 510 of FIG. 5, the processed video may be displayed to the target display panel.

While not shown in FIG. 5, in some embodiments, the decoding/display pipeline may include a compositing component that composites other digital information such as text with streamed video content. In some embodiments, the decoding/display pipeline may convert the input video into a linear color space (e.g., a linear RGB or YCC color space) for compositing prior to element 508 of FIG. 5. The output of the compositing component may then be processed according to the content, display characteristics, and current environment information to generate the video adapted to the display panel and the current environment.

The elements of FIG. 5 are described in more detail with reference to FIGS. 1 through 4.

Referring again to FIG. 1, in embodiments of display-side adaptive video processing systems, the decoding/display pipeline 130 may obtain encoded video stream 112, display information 142A, and environment information 152A and take into account one or more of, but not limited to, video content, display panel characteristics, viewer 180 location with respect to the target display panel, ambient lighting 192, and other ambient environment 190 conditions at the display panel 140 when performing HDR video processing. Encoded HDR video data 112 may be received at the decoding/display pipeline 130 from a server/encoding pipeline 110 and decoded. In some embodiments, the decoded video data may be analyzed to determine for example luminance characteristics (e.g., dynamic range), color characteristics (e.g., color range), inter-frame motion, specular highlights, contrast, bright and dark regions, and so on. Based on the analysis of the video content, one or more video processing functions of the decoding/display pipeline 130 (e.g., noise/artifacts reduction, scaling and sharpening, frame rate conversion, display management, etc.) may be adjusted to adapt the video content for display on the target display panel 140. In some embodiments, one or more display characteristics (e.g., display format, dynamic range, bit depth, backlight level, white point, current control 160 settings, etc.) of the target display panel 140 may also be considered in adjusting the video processing functions.

In some embodiments, the video processing functions may instead or in addition be dynamically adjusted according to analysis of one or more current environmental conditions of the display panel as detected by one or more sensors 150 (e.g., cameras, light sensors, etc.) at or near the target display panel 140 to dynamically adapt the displayed video to the current environment 190. In some embodiments, the video processing functions may be adjusted at least in part based on one or more viewer 180 characteristics such as location, distance, and viewing angle with respect to the display panel 140 as detected by the sensor(s) 150. In some embodiments, information 152A about the environment 190 of the display panel 140 such as ambient light 192 levels may be obtained via the sensor(s) 150, and the video processing functions may be adjusted to adapt the display video to the ambient environment 190 based at least in part on the obtained environment information 152A.

In some embodiments, other information may be obtained and used in adjusting the processing of video in the decoding/display pipeline 130 to target the displayed video to the viewer's mood or viewing intentions, which may be referred to as viewing mode. For example, in some embodiments, lighting, location, time of day, biometrics, and/or other data may be used to automatically determine a viewing mode for the video. The determined viewing mode may then be used to adjust one or more of the video processing functions to adapt the displayed video to the viewing mode. Viewing modes may range from a calm or relaxed viewing mode to a cinematic or dynamic viewing mode. In some embodiments, user input (e.g., via a display panel control, remote control, smartphone app, etc.) may instead or also be used in determining or adjusting the viewing mode.

In some embodiments, in addition to performing display-side adaptive video processing in a decoding/display pipeline 130 as described above, at least some environment information 152B and/or display information 142B collected by system 120 may be sent upstream to a server/encoding pipeline 110 in a video playback system. The server/encoding pipeline 110 may then take into account one or more of, but not limited to, display panel 140 characteristics, viewer 180 location with respect to the target display panel, ambient lighting 192 and other ambient environment 190 conditions at the display panel 140 when processing and encoding video content obtained from source 100 to generate encoded video stream 112. For example, in some embodiments, the decoding/display pipeline 130 may be used in live streaming, recording, or video capture environments, and the system 120 may feed back one or more display-side metrics 142B and 152B to the server/encoding pipeline 110 so that the pipeline 110 can adapt or adjust one or more encoding functions accordingly when processing input video content from source 100 to generate the encoded video stream 112

Figure 2:
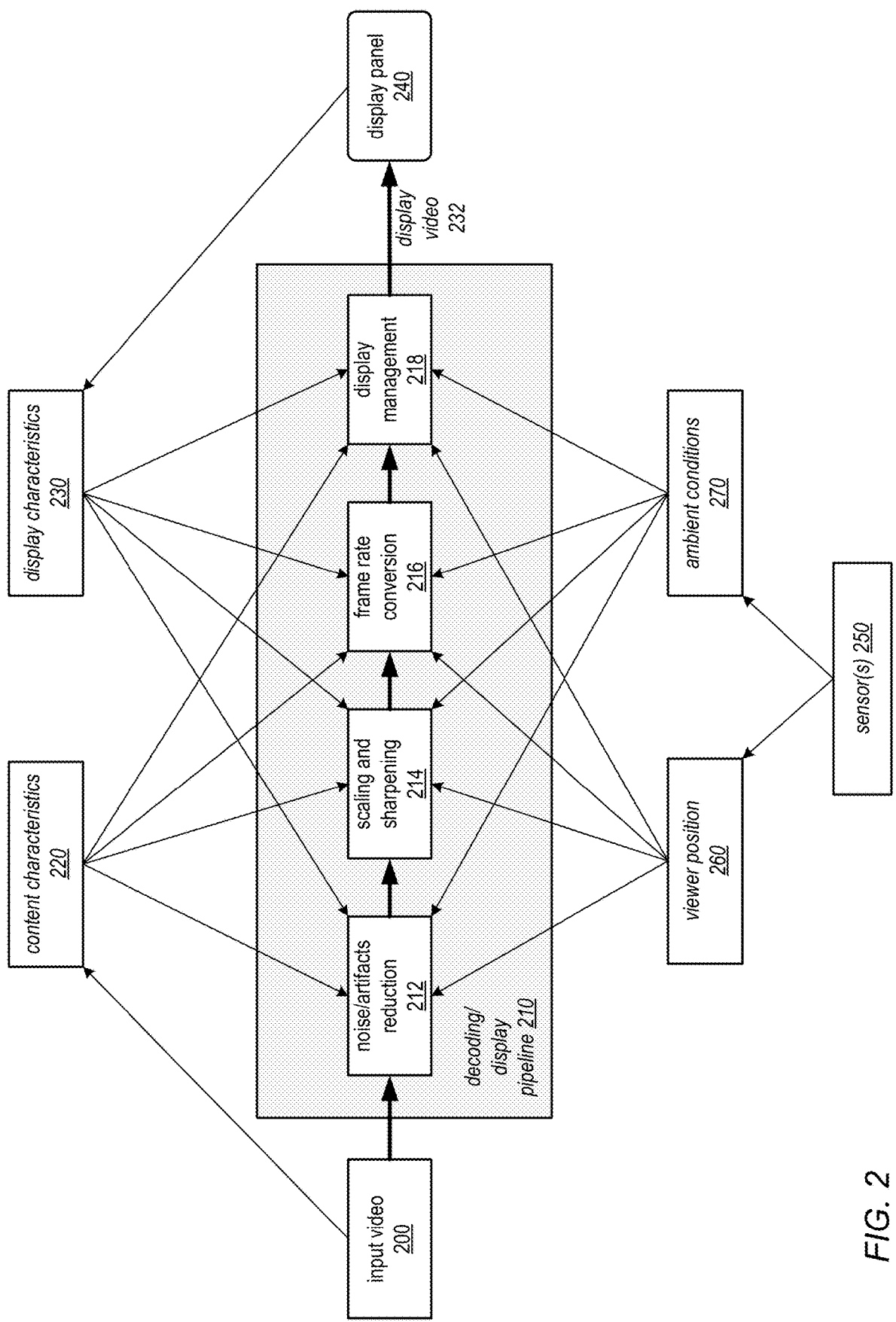
FIG. 2 illustrates adaptive video processing in an example decoding/display pipeline, according to some embodiments.
Figure 3:
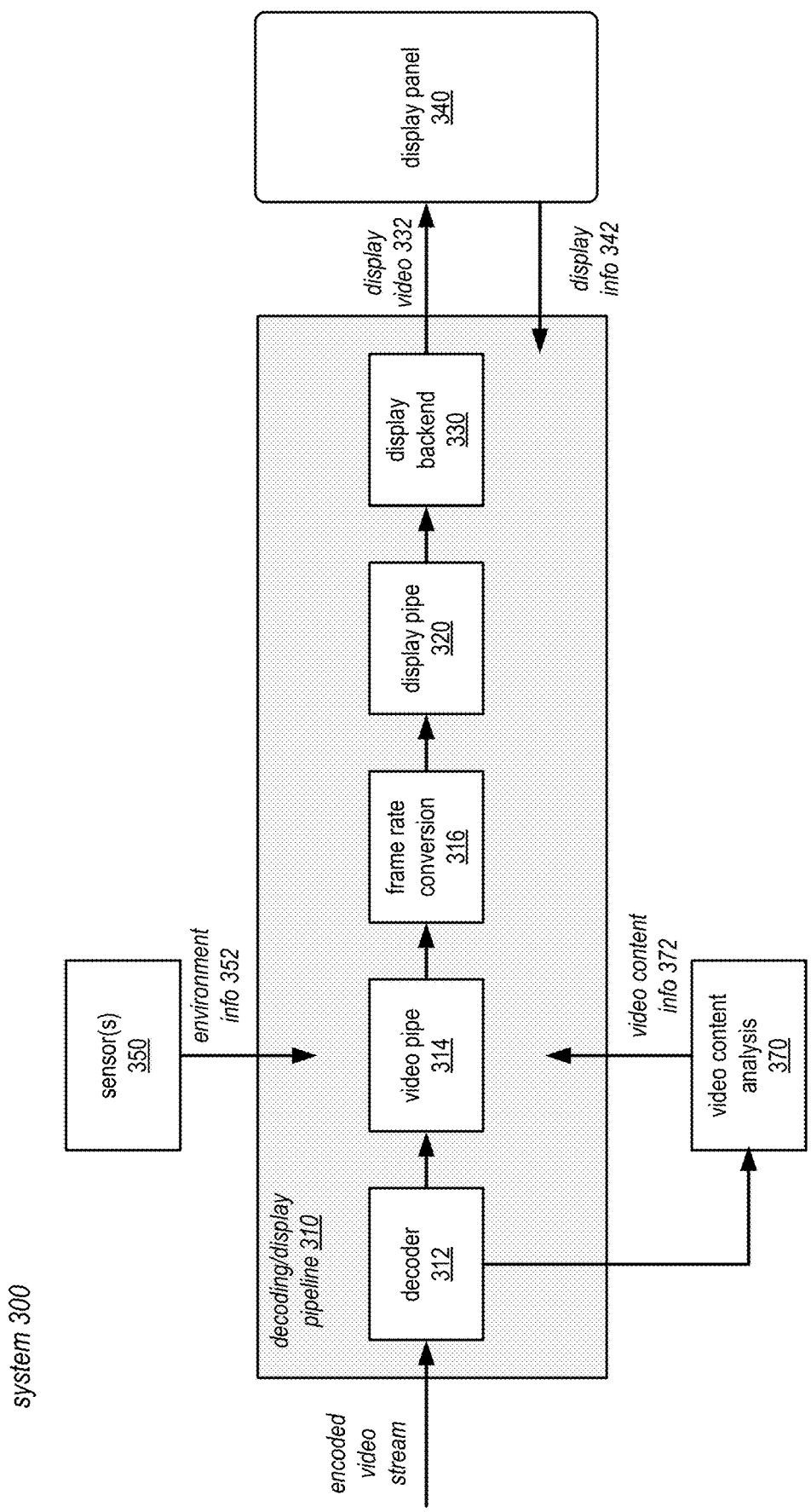
FIG. 3 illustrates an example decoding/display pipeline that performs adaptive video processing, according to some embodiments.
Figure 4:
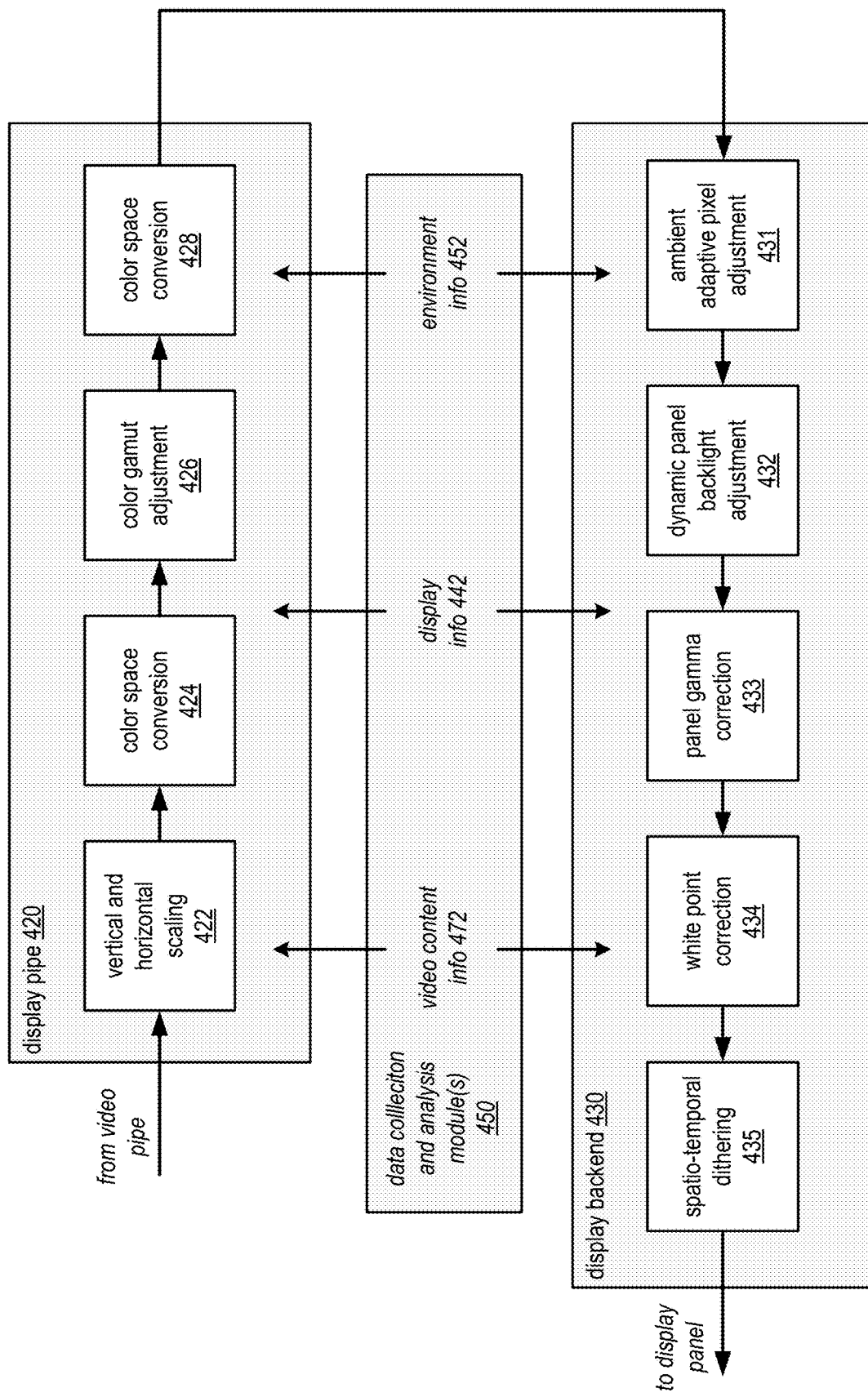
FIG. 4 illustrates an example display pipe and display backend that perform adaptive video processing, according to some embodiments.

FIGS. 2 through 4 illustrate example display-side components and pipelines that may implement adaptive video processing methods as described herein.

FIG. 2 is a block diagram graphically illustrating application of adaptive video processing methods in an example decoding/display pipeline process, according to some embodiments. Note that FIG. 2 shows an example decoding/display pipeline 210 at a high, functional level, and is not intended to be limiting. In this example, the pipeline 210 implements noise artifact reduction 212, scaling and sharpening 214, frame rate conversion 216, and display management 218 functionality. The pipeline 210 processes input video 200 to generate display video 232 as output. As shown in FIG. 2, information including characteristics of the video 200 content, characteristics of the display panel 240, and environmental conditions including but not limited to viewer position and ambient lighting may be input to and used at one or more of the stages of pipeline 210 to adaptively render the video content for display to the target display panel 240 under current environmental conditions. In at least some embodiments, a decoding/display pipeline 210 may be configured to process HDR video 200 input to generate HDR display video 232 for a target display panel 240. However, a decoding/display pipeline 210 may instead or in addition be configured to process SDR video 200 input to generate SDR display output 232.

For HDR video processing, there may be certain things that need to be done differently than with normal (SDR) video. Typically, with a brighter image, noise in shadow or dark regions becomes more visible. Thus, more aggressive noise/artifact reduction 212 may need to be performed by a decoding/display pipeline 210 in HDR video processing. In addition, with a brighter image and with movement, there may be more judder in HDR video frames, possibly resulting in a blurry appearance that is difficult for human eyes to track. Thus, for HDR video processing in a decoding/display pipeline 210, scaling and sharpening 214 and frame rate conversion 216 may need to be performed differently than in SDR video processing.

Conventionally, video processing pipelines have been have been controlled via user inputs to various controls or user interface (UI) elements, and are not dynamically adaptive to metrics such as video content, display characteristics, human viewing distance and angle, and ambient lighting conditions when rendering video for display. As shown in FIG. 2, embodiments of a decoding/display pipeline 210 may leverage metrics collected or generated from input video 200 content, the display panel 240, and the environment (including but not limited to viewer position and ambient conditions such as ambient lighting) to dynamically adapt video content for display in different viewing environments and conditions. In addition, the metrics may be used to optimize HDR video processing in video processing functions or modules including but not limited to noise/artifact reduction 212, scaling and sharpening 214, frame rate conversion 216, and display management 218 functions or modules.

Referring to FIG. 2, input video 200 data may be fed into a content characteristics 220 block or module. The module 220 may analyze the video content to determine, for example, how wide the dynamic range is, how much movement there is from frame to frame or scene to scene, color ranges, specular highlights, contrast, bright and dark regions, and so on. In addition, one or more display characteristics 230 may be obtained for the target display panel 240. The display characteristics 230 may include one or more of, but are not limited to, measured response, display format, display dynamic range, bit depth, backlight level(s), white point, black leakage, reflectivity, local contrast enhancement or mapping, current display control settings, and so on. Based at least in part on the analysis of the video content and the display characteristics, certain controls may be determined and go into different ones of the video processing modules (e.g., noise/artifacts reduction 212, scaling and sharpening 214, frame rate conversion 216, and display management 218) accordingly to adjust the processing of the input video 200 to generate HDR display video 232 for the target display panel 240.

An important factor to consider in HDR video processing is human perception. If the human viewing distance/angle is known, several things may be done that may enhance the viewer's experience. Thus, a device may include sensor(s) 250 and software/hardware (viewer position 260 module) for detecting and analyzing human (viewer) location, distance, and viewing angle. This information may be leveraged by one or more of the modules in the pipeline 210 to adapt display of HDR video content according to the viewer's location. For example, when sharpening an image, the image may look bad if the viewer is very close to the display panel 240. Thus, sharpening may be reduced if the viewer is detected as being relatively close to the display panel 240.

In addition to viewer position, other environmental information, including but not limited to ambient lighting, may be important in HDR video processing. If ambient lighting conditions are known, several things may be done that may enhance the viewer's experience. Thus, a device may include sensor(s) 250 and software/hardware (ambient conditions 270 module) for detecting and analyzing ambient lighting conditions. This information may be leveraged by one or more of the modules in the pipeline 210 to adapt display of HDR video content according to the ambient environment. For example, when tone mapping and/or gamut mapping is applied to the video content for display, the mapping may be dynamically adjusted based on an analysis of the current ambient lighting.

Thus, embodiments of a decoding/display pipeline 210 are described that may collect and analyze video content, viewer, display, and environment metrics, and use this information to adjust the processing of input HDR video 200 content in the pipeline 210 to generate display video 232 output adjusted to current conditions at a target display panel 240. In some embodiments of the decoding/display pipeline 210, collection and analysis of the various metrics and adjustment of the video processing modules in the pipeline to adapt the display to current conditions may be performed automatically, without human intervention, to dynamically and automatically provide an improved or optimal viewing experience. Changes in conditions (e.g., viewer position, ambient light, video content, display characteristics, display settings, etc.) may be automatically detected and used to responsively adjust the rendering and display of HDR video content in real- or near-real time.

FIGS. 3 and 4 illustrate components of an example decoding/display pipeline that may perform display-side processing of video content, and that may implement embodiments of the display-side adaptive video processing methods as described in reference to FIGS. 1 and 2.

FIG. 3 illustrates an example decoding/display pipeline that may perform adaptive video processing, according to some embodiments. A system 300 may include, but is not limited to, a display panel 340, a decoding display pipeline 310, and one or more sensors 350. Decoding/display pipeline 310 may include, but is not limited to, a decoder 312 component or module, a video pipe 314 component or module, a frame rate conversion 316 component or module, a display pipe 320 component or module, and a display backend 330 component or module. Referring to FIG. 2, video pipe 314 may perform noise/artifacts reduction 212 and scaling/sharpening 214 functions, and a frame rate conversion 316 module may perform frame rate conversion functions. Display management 218 as illustrated in FIG. 2 may include a display pipe 320 component and a display backend 330 component. FIG. 4 illustrates an example display pipe and display backend.

Referring to FIG. 3, an encoded HDR video stream (e.g., an H.264/AVC or H.265/HEVC encoded video stream) may be received at a decoder 312 component of a decoding/display pipeline 310. The decoder 312 may decode/decompress the input video to generate HDR video content that is fed to a video pipe 314. The video pipe 314 may perform video processing tasks on the video content including but not limited to noise/artifact reduction, scaling, sharpening, and color processing. In some embodiments, a frame rate conversion 316 component may convert the video output by the video pipe 314 to a higher frame rate by generating intermediate video frame(s) between existing frames. Converting to a higher frame rate may, for example, help to compensate for judder that may appear in HDR video. Output of the frame rate conversion 316 component may be fed into a display pipe 320 that may perform video processing tasks including but not limited to scaling, colors space conversion(s), color gamut adjustment, and tone mapping. A display backend 330 may then perform additional video processing tasks including but not limited to color (chroma) and tone (luma) adjustments, backlight adjustments, gamma correction, white point correction, black point correction, and spatio-temporal dithering to generate display video 332 output to a target display panel 340.

As shown in FIG. 3, decompressed video content may be processed by a video content analysis 370 module to generate video content information 372. In addition, display information 342 may be obtained for the target display panel 340. In addition, environment information 352 including but not limited to viewer metrics (e.g., location) and ambient environment metrics (e.g., ambient lighting metrics) may be obtained, for example via one or more sensors 350 located at or near the display panel 340. The video content information 372, display information 342, and/or environment information 352 may be input to and used by one or more of the components or modules in the decoding/display pipeline 310 to dynamically adjust one or more of the video processing functions performed by the module(s) according to the information. Thus, current conditions (e.g., viewer position, ambient light, video content, display characteristics, display settings, etc.) may be detected, analyzed, and used to dynamically adapt the rendering and display of HDR video content to a target display panel 340 in real- or near-real time.

While not shown in FIG. 3, in some embodiments, the decoding/display pipeline 310 may include a compositing component that composites other digital information such as text with streamed video content. In some embodiments, the decoding/display pipeline 310 may convert the input video into a linear color space (e.g., a linear RGB or YCC color space) for compositing. The output of the compositing component may then be adapted to the display and ambient environment as described herein.

FIG. 4 illustrates an example display pipe 420 and display backend 430 that may perform display-side adaptive video processing, according to some embodiments. Output of a video pipe as illustrated in FIG. 3 be fed into a display pipe 420 that may perform vertical and horizontal scaling 422 to convert the video frames to the target display panel resolution. Color space conversion 424 may then be performed to convert the scaled video content from the color space of the input video content (e.g., an RGB, YCC, or XYZ color space) to another color space (e.g., a YCC color space). Color gamut adjustment 426 may then be performed on the video content to adjust the color (chroma) component of the video content to the color gamut of the target display panel. Another color space conversion 424 may then be performed to convert the video content to the color space of the display backend 430 (e.g., and RGB color space). The video content processed by the display pipe 420 is then provided to a display backend 430.

Display backend 430 may perform additional, display panel-specific video processing tasks on the video content. In some embodiments of a display backend 430, an ambient adaptive pixel adjustment 431 component may adjust pixel values in the video content in response to ambient conditions including but not limited to one or more ambient light metrics. In some embodiments, ambient adaptive pixel adjustment 431 may involve adjusting the chroma (color) and luma (luminance) components of the video content separately, for example in a YCC color space. In some embodiments, gamut mapping and tone mapping techniques may be used in adjusting the pixel values according to the ambient conditions. For example, curves or transfer functions used in a gamut or tone mapping technique may be modified according to the ambient conditions.

In some embodiments of a display backend 430, a dynamic panel backlight adjustment 432 component may adjust backlight levels for the target display panel according to the video frame content. In some embodiments, as an alternative to global backlight adjustment, the backlight level may be dynamically adjusted for different regions of the video frame according to the content of the regions. For example, backlight level may be higher for a bright region of a video frame than for a relatively darker region of the video frame.

In some embodiments of a display backend 430, panel gamma correction 433 may be performed to adjust brightness of the video content for proper display on the target display panel. White point correction 434 may then be performed to correct the white point of the video content to the white point of the target display panel. In some embodiments of a display backend 430, spatial (within a frame) and/or temporal (across two or more frames) dithering may then be applied to the video content to reduce or eliminate artifacts (e.g., banding patterns) in the displayed video content.

As shown in FIG. 4, one or more data collection and analysis modules 450 may dynamically collect and analyze video content, display characteristics, and environmental conditions (e.g., ambient light) to generate video content information 472, display information 442, and/or environment information 452 that may be input to and used by one or more of the components or modules in the display pipe 420 and/or display backend 430 to dynamically adjust one or more of the video processing functions performed by the module(s) according to the information.

Ambient Adaptive Rendering Using Perceptual Color Management

The human visual system has a wide lux range. At any given time, however, human vision is only adapted to a small part of that range. At least some embodiments of the adaptive video processing methods and apparatus as described herein may detect and analyze ambient environmental conditions including but not limited to ambient lighting to determine a current range for human vision according to the current conditions, and may adapt the rendering and display of video content to a target display panel into that range according to the current conditions. This process may be referred to as ambient adaptive rendering. In some embodiments, ambient adaptive rendering may be performed on the display side of an adaptive video processing pipeline. For example, in some embodiments, ambient adaptive rendering may be implemented by a decoding/display pipeline as illustrated in FIGS. 1 through 5.

Figure 6A:
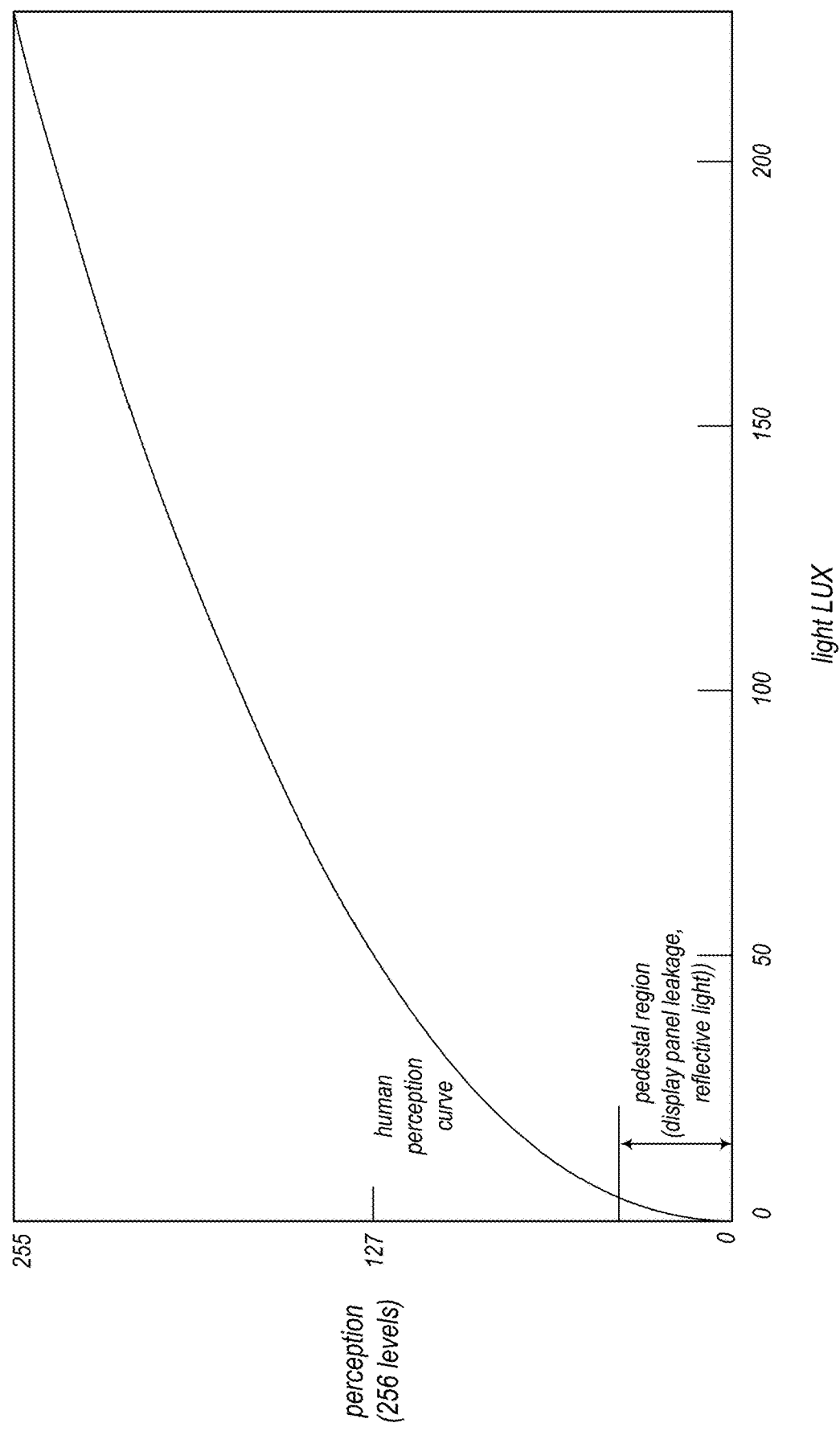
FIGS. 6A and 6B illustrate the human perceptual range with respect to an example display panel.
Figure 6B:
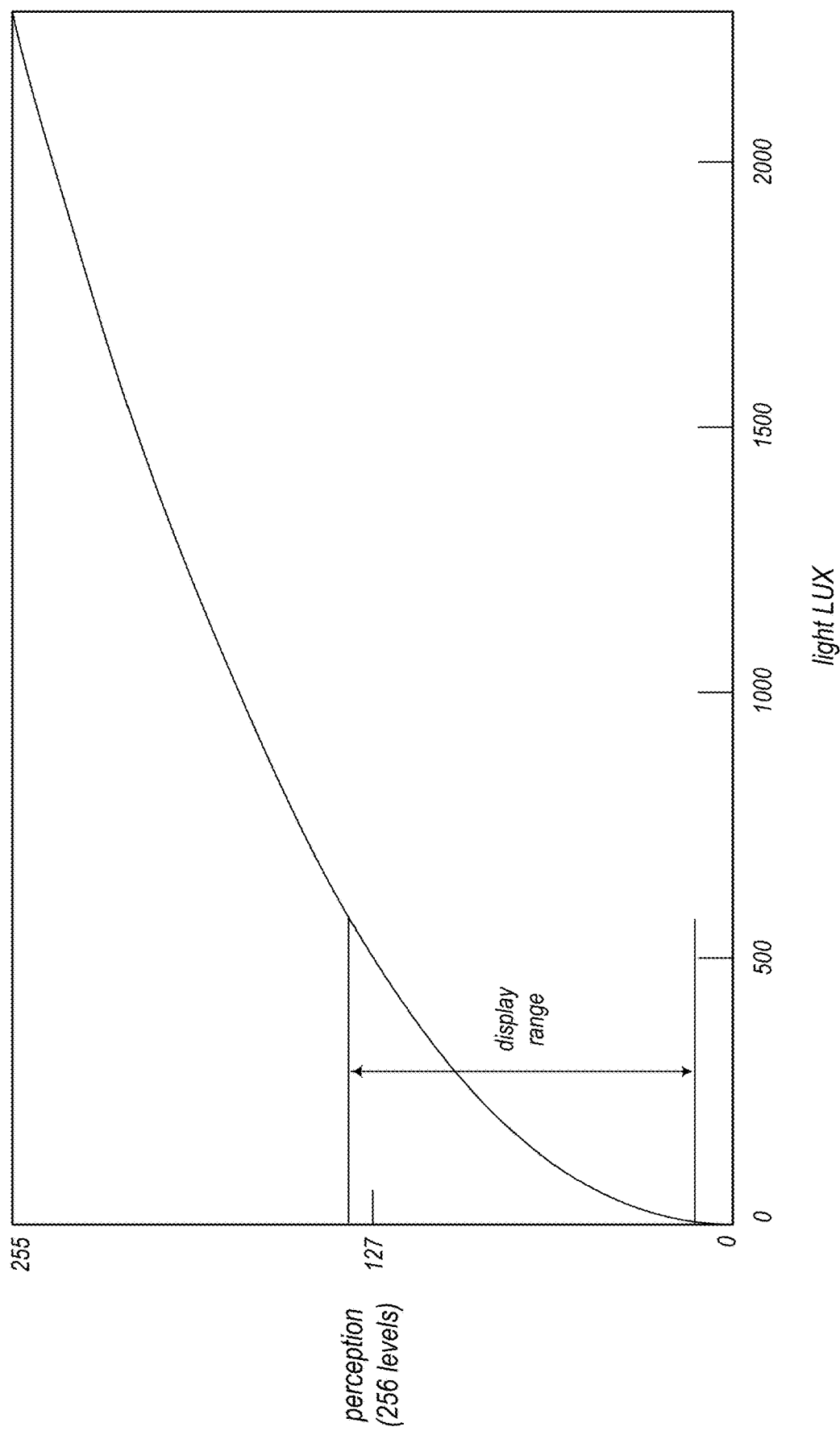

FIGS. 6A and 6B illustrate the human perceptual range with respect to an example display panel. FIG. 6A illustrates perceptual range for a display in a dim environment. FIG. 6B illustrates perceptual range for a display in a brighter environment. As illustrated by the curve in FIG. 6A, human perception is non-linear. However, human vision has a wide lux range, from starlight ($10^{-4}$ lux) to direct sunlight ($10^4$ lux). At any given time, however, human vision is only adapted to a small part of that range, and generally adapts to a brightest stimulus or object. At any given adaptation level, there are only about 256 different levels of intensity that the human visual system can distinguish. FIG. 6A illustrates a fairly bright display in a fairly dim environment; the display mimics human vision fairly well. The vertical axis represents 256 perceptual levels (intensities). The pedestal region is a region that is difficult to render properly. The pedestal region includes shades of gray that cannot be reached with the display due to display leakage in black as well as reflective light off the display panel, and illustrates how black on the display is perceptually differently from true black in terms of vision.

FIG. 6B shows a mapping of human perception into a brighter environment in which the display can only excite a portion of human perception. The portion of the curve indicated as the display range only excites less than one half of the human visual range. The perceived response of the display is different from its measured response. Thus, there is a limit in terms of the dynamic range that can be expressed on the display.

As previously noted, at a given adaptation level, there are only about 256 different levels of intensity that the human visual system can distinguish. Embodiments of ambient adaptive rendering methods may detect and analyze ambient environmental conditions including but not limited to ambient lighting to determine a current range for human vision according to the current conditions, and may adapt the rendering and display of video content to a target display panel into that range according to the current conditions using a perceptual color management system as described herein.

In at least some embodiments, ambient adaptive rendering may be performed according to a color appearance model and color management system. A color management system may control conversions between the color representations of various devices including but not limited to camera devices and display devices according to a color appearance model. Broadly defined, a color appearance model is a mathematical model that describes a way in which colors can be represented, generally using three or four values or color components. A color appearance model may define dimensions of color appearance (e.g., brightness (luminance), lightness, colorfulness, chroma, saturation, and hue). A color appearance model may also define one or more transforms or transform functions, such as a chromatic adaptation transform, which may be applied to the color components. Chromatic adaption is generally define as a dynamic mechanism of the human visual system that compensates for white point changes when viewing an object in different illuminations. In a color appearance model, a chromatic adaptation transform may be used to model the chromatic adaption of the human visual system. An example color appearance model that may be used in embodiments is CIECAM02, published by the International Commission on Illumination (CIE) Technical Committee 8-01 (Color Appearance Modelling for Color Management Systems).

Conventional color management systems may map or match the source (e.g., video) intention to a measured display response, for example using gamut (color, or chroma) and gamma (tone, or luminance) mapping techniques:

Source→Measured Display

However, as noted above, the response of a display as perceived by a human viewer may be different from the display's measured response. Thus, embodiments of ambient adaptive rendering methods in an adaptive video processing system may add an additional matching step to the mapping process:

Source→Measured Display→Adapted Vision where adapted vision is a human perception range under current ambient conditions (e.g., ambient light levels), for example as determined by adaptive video processing methods and apparatus as described herein, and where the mappings (indicated by the arrows) may include transforms (e.g., chromatic adaptation transforms) of the color appearance model. Modified color management that includes this additional step in the mapping process may be referred to as a perceptual color management system. A color appearance model of a perceptual color management system may be referred to as a perceptual color model or perceptual model.

Figure 7:
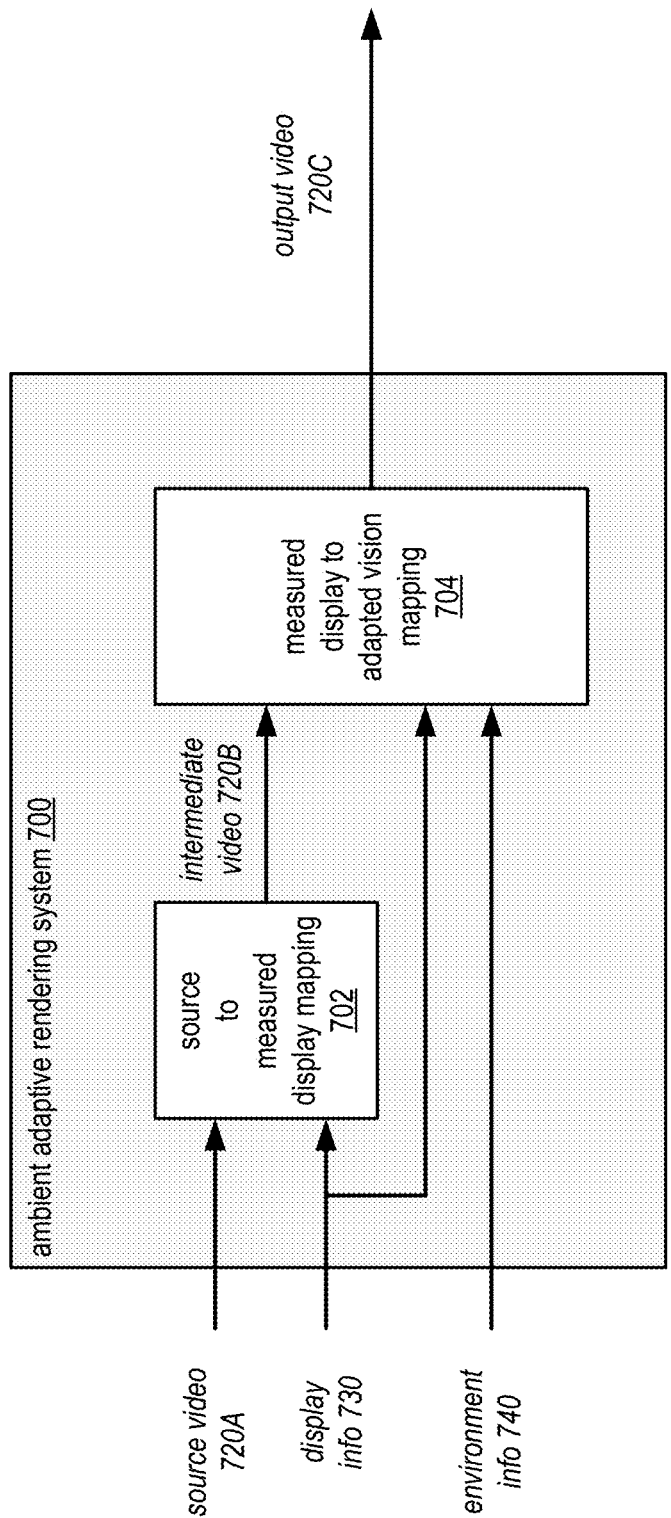
FIG. 7 graphically illustrates perceptual color management, according to some embodiments.

FIG. 7 graphically illustrates perceptual color management in an ambient adaptive rendering system 700 at a high level, according to some embodiments. As in conventional color management, source video content 720A may be mapped 702 to the measured display response range according to display information 730 to generate video content 720B. However, additional mapping 704 is applied to fit the display response into a determined adapted human vision range, generating output video 720C that is adapted to current viewing conditions according to the environment information 740 and display information 730. In some embodiments, additional mapping 704 may involve convolving by the inverse of the difference between ideal human vision in a given environment (e.g., the curve in FIG. 7B) and the portion of that which the display panel actually represents (e.g., the display range in FIG. 7B) according to the measured response of the display panel.

In some embodiments, ambient adaptive rendering system 700 may be implemented on the display side of a video playback system. For example, in some embodiments, ambient adaptive rendering may be implemented by one or more components of a decoding/display pipeline of a video playback system as illustrated in FIGS. 1 through 5.

Information that can be obtained and fed into a perceptual color model of a perceptual color management system implemented in an ambient adaptive rendering system 700 may include, but is not limited to, display information 730, for example various display characteristics and settings, and environment information 740 including but not limited to viewer and lighting information. Some of this information may be static (e.g., display characteristics such as bit depth and dimensions), while other information may be dynamic (e.g., current display settings, backlight level, ambient light, reflective light, viewer position, viewer location, etc.) This information may be collected and used to adaptively render video content 720 for display according to current ambient conditions as applied to a perceptual color model. In some embodiments, a device that includes the display panel that the video content 720 is being adapted for by the ambient adaptive rendering system 700 may include one or more sensors, for example ambient light sensors, cameras, motion detectors, and so on, that may be used to collect at least some of the information 730 and 740 used in the perceptual color model.

The following describes various measurements, metrics or characteristics that may be obtained and input to a perceptual color model in an ambient adaptive rendering system 700, according to some embodiments. However, this list is not intended to be limiting:

Physical dimensions and other static characteristics of the display.
Measurements. These metrics may be pre-measured for a type of display panel or may be measured for an individual display panel:
  The measured response of the display panel—a mapping between the input levels from the source video content and the light output levels of the display panel for each color (e.g., RGB) channel.
  Measured native white point of the display panel.
  Measured light leakage from the display panel (contributes to the pedestal as illustrated in FIG. 6A).
  Measured reflective light off the display panel (contributes to the pedestal as illustrated in FIG. 6A).
  Measured maximum (and minimum) backlight level for the display.
Ambient metrics, for example captured by sensor(s) or determined from data captured by sensor(s). A device that includes a display panel may also include one or more sensors. The sensors may include one or more of, but are not limited to, ambient light sensors, color ambient light sensors, and cameras. The light sensors and cameras may include one or more backward (towards the viewer or user) facing sensors and/or one or more forward (away from the viewer or user) facing sensors:
  Light currently hitting the display panel. This may be determined for each color channel.
  Amount of light reflecting off the display. This may be determined for each color channel.
  Metrics (e.g., brightness, color, etc.) of the field of view or background that the viewer/user is facing.
  The white point that the viewer is adapted to.
  Position of the viewer(s) with respect to the display panel (e.g., distance, viewing angle, etc.) In some embodiments, a user-facing camera of the device that includes the display panel may capture an image of a viewer, and the image may be analyzed to estimate a distance from the viewer to the device. For example, the image of the viewer's face may be analyzed to determine the distance, based on measured distance between the viewer's eyes in the captured image, as human eyes tend to be about the same distance apart. The estimated distance to the viewer may, for example, be used to estimate the field of view that the display panel subtends.
Dynamically determined display metrics:
  Current backlight level of the display panel.
  Current average pixel brightness (pixels actually illuminated). For example, this metric may be used in determining the brightness of the currently displayed video content. This may be determined for each color channel.

While not shown in FIG. 7, in some embodiments, in addition to display information 730 and environment information 740, other information may be obtained and used by the ambient adaptive rendering system in adapting the video to the environment. For example, in some embodiments, the ambient adaptive rendering system 700 may target the displayed video to a viewer's mood or viewing intentions, which may be referred to as viewing mode. For example, in some embodiments, lighting, location, time of day, biometrics, and/or other data may be acquired and used to automatically determine a viewing mode for the video content 720. The determined viewing mode may then be input to the perceptual color model to adjust the source video content 720 to the viewing mode. For example, viewing modes may range from a calm or relaxed viewing mode to a cinematic or dynamic viewing mode. In some embodiments, user input (e.g., via a display panel control, remote control, smartphone app, etc.) may instead or also be used in determining or adjusting a viewing mode for video content 720. For example, in some embodiments, a viewer may adjust a slider or switch for a "mood" or "intention" parameter, for example to adjust or select between two or more viewing mode on a discrete or continuous scale between a most relaxed "calm" mode and a dynamic, brightest, "cinematic" mode.

Various embodiments of an ambient adaptive rendering system 700 may use various image processing algorithms and techniques including but not limited to color gamut mapping and global or local tone mapping techniques to apply the rendering adjustments to the video content 720. In some embodiments, at least a portion of the ambient adaptive rendering 700 functionality may be implemented using one or more Graphics Processor Units (GPUs). For example, some embodiments may implement a custom shader that may apply adjustments determined according to the perceptual color model to video content 720. In some embodiments, at least a portion of the ambient adaptive rendering 700 functionality may be implemented in or by other hardware including but not limited to custom hardware. For example, in some embodiments, one or more Image Signal Processor (ISP) color pipes may be used to apply the rendering adjustments to the video content 720.

In some embodiments, one or more color lookup tables (CLUTs) may be used to apply at least some of the adaptive adjustments to the video content 720. For example, in some embodiments, three 1D (one-dimensional) LUTs may be warped in hardware to apply adaptive adjustments to the video content 720.

Embodiments of an ambient adaptive rendering system 700 may automatically adapt HDR video content to a target display panel based on the display panel's characteristics and capabilities.

Embodiments of an ambient adaptive rendering system 700 may dynamically adapt video content for display in different viewing environments, which may provide improved viewing in different environments and/or under different ambient conditions. Thus, the ambient adaptive rendering system 700 may provide an improved viewing experience for users of mobile devices by automatically adapting displayed content according to changes in the environment in which the users are viewing the content.

By dynamically adapting a display panel to different environments and ambient conditions, embodiments of an ambient adaptive rendering system 700 may use less backlight in some viewing environments, which for example may save power on mobile devices. In some embodiments, the backlight can be mapped into the perceptive color model, which may for example allow the ambient adaptive rendering system 700 to make the display act more paper-like when adapting to different environments and ambient conditions. In other words, the ambient adaptive rendering system 700 may be able to match the display to the luminance level of paper in the same environment, as well as track and adjust to or for the white point of the viewer's environment.

In some embodiments, information collected or generated by the ambient adaptive rendering system 700 may be fed forward (upstream) in a video processing pipeline and used to affect video processing before the video content is processed by the ambient adaptive rendering system 700. For example, referring to FIGS. 1 through 3, ambient adaptive rendering may be implemented in or by a display pipe and/or display backend component of a display pipeline. Display and/or environment information may be fed upstream to one or more components or stages of the display pipeline (e.g., to a decoder, video pipe, and/or frame rate conversion stage, or to a compositing component that composites other digital information such as text with streamed video content) and used to affect video content processing at those upstream components of the display pipeline.

In some embodiments, referring to FIG. 1, display and/or environment information collected by the display-side ambient adaptive rendering system 700 may be fed back to a server/encoding pipeline and used to affect the server-side processing of video content before the content is streamed to a device that includes the target display panel. For example, in some embodiments, the display and/or environment information may indicate that the capabilities of the target display panel does not support full HDR imaging in an ambient environment. In response, the server/encoding pipeline may process and encode input HDR content into a lower dynamic range that can be displayed by the target display panel under the current conditions. This may, for example, save transmission bandwidth when a target display panel cannot support the full dynamic range that is available in the source video content.

Display-Side SDR to HDR Conversion

Referring again to FIG. 1, in some embodiments, one or more characteristics of the input encoded video stream 112 may be used by the decoding/display pipeline 130 in adjusting the one or more of the video processing functions to adapt the video to a target display panel 140. For example, in some embodiments, the target display panel 140 may support HDR imaging. However, the decoding/display pipeline 130 may receive encoded standard dynamic range (SDR) video data for display to the target panel 140. Conventionally, SDR to HDR processing has been performed by linearly scaling the SDR video content to the HDR target display. However, HDR imaging is much brighter than SDR imaging, and conventional linear scaling from SDR video content does not result in video content that is optimally adapted to the higher dynamic range; moreover, the linear scaling may result in visible artifacts. For example, specular highlights may be dimmed or lost, dark areas may be noisy, and color or tonal banding may be visible.

To improve the quality of HDR video content generated from SDR video input, in some embodiments, upon detecting SDR video data, the decoding/display pipeline 130 may adjust one or more of the video processing functions, and/or perform one or more additional processing functions, to convert the decoded SDR video input to an HDR imaging format for improved display at the higher dynamic range of the HDR target panel 140. Broadly described, these adjustments may involve non-linear mappings of the SDR video content into the HDR space to improve the quality (e.g., brightness) of the content when displayed to the target HDR display panel.

Figure 8:
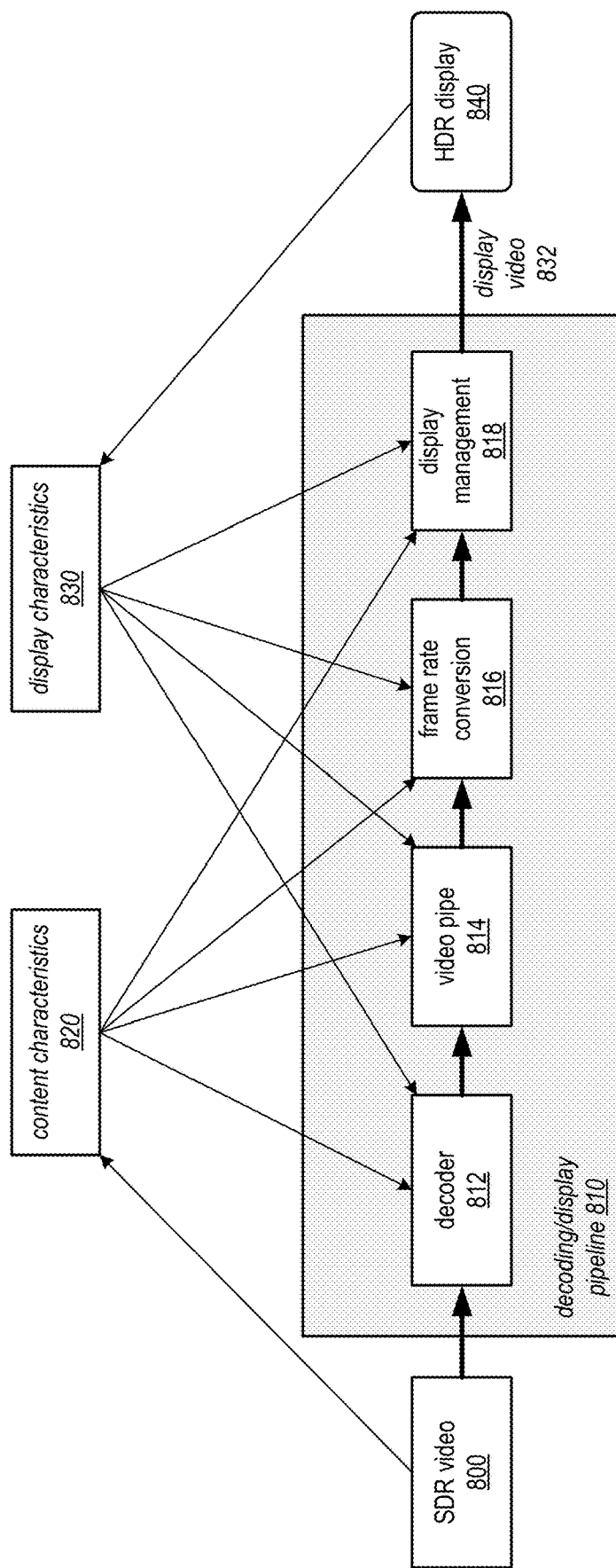
FIG. 8 illustrates an example decoding/display pipeline performing SDR-to-HDR conversion on SDR input vide to generate display video content adapted to an HDR display, according to some embodiments.
Figure 9:
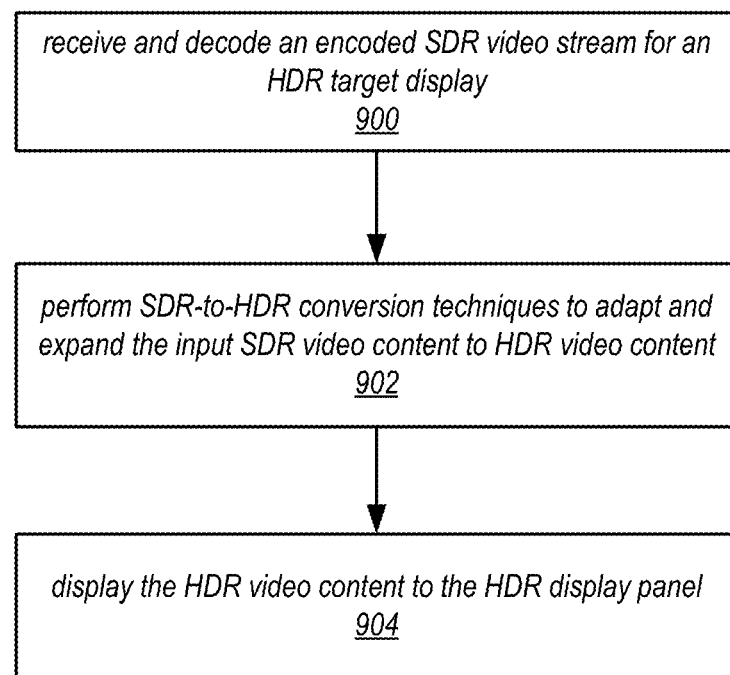
FIG. 9 is a flowchart of a method for performing SDR-to-HDR conversion vide to generate display video content adapted to an HDR display, according to some embodiments.

FIG. 9 is a high-level flowchart of a method for performing SDR-to-HDR conversion vide to generate display video content adapted to an HDR display, according to some embodiments. As indicated at 900 of FIG. 9, a decoding/display pipeline may receive and decode an encoded SDR video stream for an HDR target display. As indicated at 902 of FIG. 9, the decoding/display pipeline may perform one or more non-linear SDR-to-HDR conversion techniques to adapt and expand the input SDR video content to HDR video content adapted the HDR-enabled display panel. As indicated at 904 of FIG. 9, the HDR video content may be displayed to the HDR display panel. The elements of FIG. 9 are described in more detail with reference to FIG. 8.

FIG. 8 illustrates an example decoding/display pipeline performing SDR-to-HDR conversion on SDR input video to generate display video content adapted to an HDR display, according to some embodiments. In at least some embodiments, a decoding/display pipeline 810 may be configured to process HDR video input to generate HDR display video 832 for a target display panel 840. However, decoding/display pipeline 810 may instead receive SDR video 800 input.

As shown in FIG. 8, embodiments of the decoding/display pipeline 810 may leverage content characteristics 820 determined from input SDR video 800 content and display characteristics 830 of the display panel 840 to convert the SDR video 800 input to HDR video 832 output for display to an HDR-enabled display panel 840. In some embodiments, decoding/display pipeline 810 may include video processing functions or modules including but not limited to decoder 812, video pipe 814, frame rate conversion 816, and display management 818 functions or modules. Content characteristics 820 and display characteristics 830 may be provided to one or more of these modules and used in adapting the respective function(s) for converting SDR video 800 input to HDR video 832 output.

An encoded SDR video 800 stream (e.g., an H.264/AVC or H.265/HEVC encoded video stream) may be received at a decoder 812 component of the decoding/display pipeline 810. The decoder 312 may decode/decompress the input video to generate video content that is fed to a video pipe 814. Video pipe 814 may, for example, perform noise/artifact reduction, scaling and sharpening. In some embodiments, either the decoder 812 or the video pipe 814 may convert the input SDR video 800 into an HDR-compatible format, for example by converting to a format with an extended bit depth to support HDR imaging.

Frame rate conversion 816 may convert the video output by the video pipe 814 to a higher frame rate by generating intermediate video frame(s) between existing frames. Converting to a higher frame rate may, for example, help to compensate for judder that may appear in HDR video.

Display management 818 may include a display pipe that may perform video processing tasks including but not limited to scaling, colors space conversion(s), color gamut adjustment, and tone mapping, and a display backend that may perform additional video processing tasks including but not limited to color (chroma) and tone (luma) adjustments, backlight adjustments, gamma correction, white point correction, black point correction, and spatio-temporal dithering to generate HDR display video 832 output to a target HDR-enabled display panel 840.

In embodiments, content characteristics 820 and display characteristics 830 may be provided to one or more of the modules in the decoding/display pipeline 810 and used in adapting the respective function(s) for converting SDR video 800 input to HDR video 832 output. Various enhancements may be performed by the decoding/display pipeline 810 based on the characteristics that may improve the display of the video content when converted from SDR to the higher dynamic range supported by the display panel 840. The following describes examples of enhancements that may be performed when converting SDR video to HDR video, and is not intended to be limiting.

In some embodiments, in response to detecting SDR video 800 content, content characteristics 820 module may analyze the video content to look for areas in video frames with specular highlights. Thus, content characteristics that are detected may include specular highlights in the input video frames. The decoding/display pipeline 810 may reduce the size of at least some of the specular highlights, and/or increase the brightness of at least some of the specular highlights, to make the specular highlights appear more impressive when displayed.

In some embodiments, dark or shadow regions in the input SDR video 800 content may be detected and automatically processed differently by the decoding/display pipeline 810 for improved HDR display. For example, the decoding/display pipeline 810 may apply stronger noise reduction to the detected dark or shadow regions to reduce noise in the darker regions of the video content when displayed to the HDR display panel 840.

As another example, the decoding/display pipeline 810 may adjust or select tone curves used in tone mapping to deepen the shadow areas. The tone curves may be non-linear, for example S-shaped tone curves, to reduce noise in the dark regions and provide better contrast than can be obtained using conventional linear scaling. In some embodiments, the tone curves may be dynamically selected based on one or more detected content characteristics and/or display characteristics. In some embodiments, one or more metrics about the ambient environment (e.g., ambient lighting metrics) may be detected and used in determining the tone curves. In some embodiments, a non-linear, global tone curve may be selected for a video frame or sequence of frames. In some embodiments, instead of or in addition to a global tone curve, the video frames may be subdivided into multiple regions, and local tone curves may be dynamically selected for each region.

In some embodiments, color transitions caused by color clipping (e.g., during tone or gamut mapping on the encoder side) may be detected, and the decoding/display pipeline 810 may attempt to reconstruct the correct color(s) to smooth the color transitions.

In some embodiments, bit depth extension from SDR to HDR (e.g., 8-bit SDR to 10-bit HDR) may be performed by the decoding/display pipeline 810 using techniques that attempt to avoid banding artifacts by smoothing the image content when extended into the larger bit depth. For example, in some embodiments, rather than performing a linear extension into the expanded bit depth, data values for input pixels may be analyzed to determine slope, and the slope may be used to perform a non-linear extension into the expanded bit depth to produce a smoother rendering of the extended bits than can be achieved using a linear function.

Server-Side Adaptive Video Processing

Referring again to FIG. 1, in some embodiments, adaptive video processing for a target display panel 140 may be implemented in or by a server/encoding pipeline 110. These embodiments may be referred to as server-side adaptive video processing systems. Embodiments of a server-side adaptive video processing system may, for example, be used to support high dynamic range (HDR) and wide color gamut (WCG) video playback to an HDR-enabled display panel in cases where the display-side video processing pipeline does not support HDR/WCG imaging, does not support the full dynamic range and color gamut of the target display panel, or is otherwise limited. For example, embodiments of the server-side adaptive video processing system may be used to support HDR and WCG video streaming to small or mobile devices, or to legacy devices, that may have limited display-side video processing capabilities.

Figure 11:
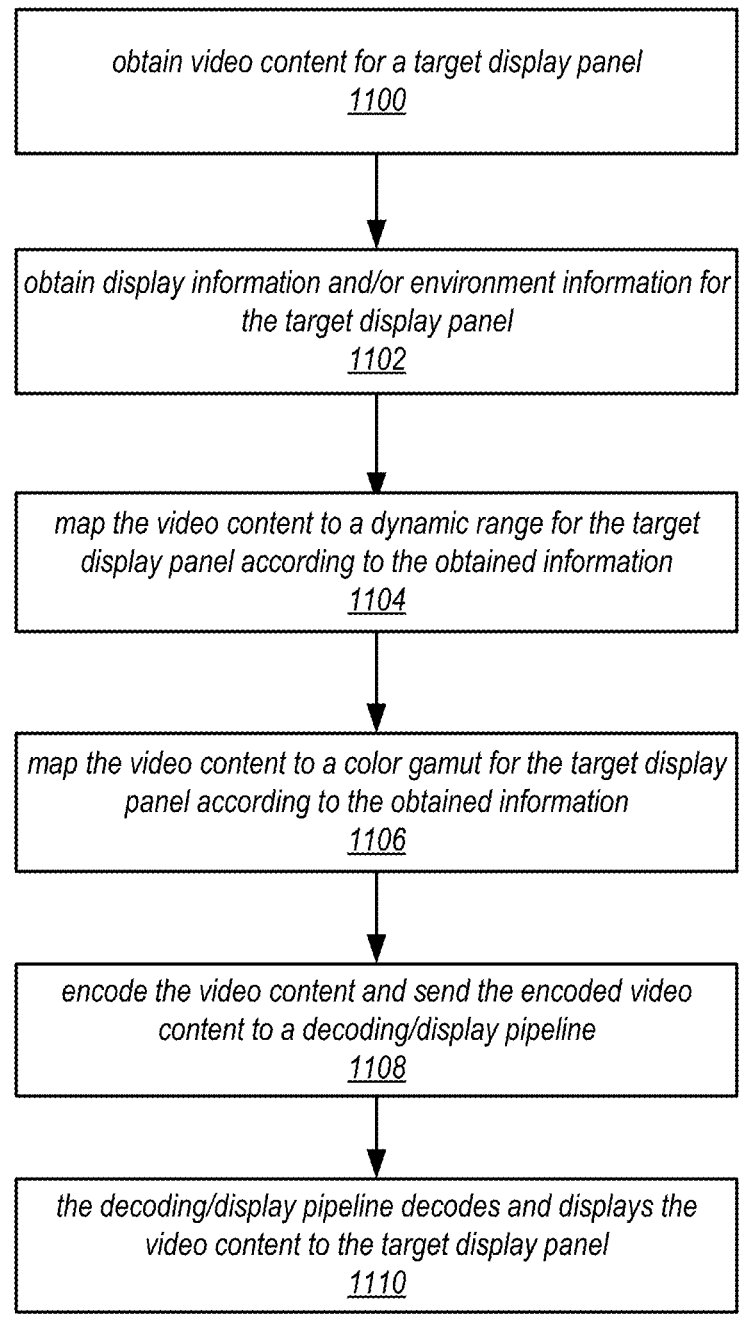
FIG. 11 is a flowchart of a video playback method in which a server-side encoding pipeline generates output video data adapted to a target display panel, according to some embodiments.

FIG. 11 is a flowchart of a video playback method in which a server-side encoding pipeline generates output video data adapted to a target display panel, according to some embodiments. As indicated at 1100 of FIG. 11, a server/encoding pipeline may obtain video content for a target display panel. For example, the server/encoding pipeline may receive input video from a video source such as a video camera on a device or system that includes the server/encoding pipeline, and may be directed to encode and stream the video content for display on a particular target display panel. The target display panel may be on the same device or system as the server/encoding pipeline, or alternatively may be on a different device or system. The target display panel may support high dynamic range (HDR) and wide color gamut (WCG) imaging.

While not shown, in some embodiments, the server/encoding pipeline may obtain or determine one or more characteristics of the input video content. For example, in some embodiments, the video content may be analyzed to determine, for example, how wide the dynamic range of the video content is, how much movement there is from frame to frame or scene to scene, color ranges, specular highlights, contrast, bright and dark regions, and so on. This content information may be used along with other information in processing the video content for display on the target display panel.

As indicated at 1102 of FIG. 11, the server/encoding pipeline may obtain display information and/or environment information for the target display panel. The display information may indicate display characteristics that may include one or more of, but are not limited to, measured response, format, resolution, size, dynamic range, bit depth, backlight level(s), white point, current display control settings, and so on. The environment information may include, but is not limited to, various ambient lighting metrics and viewer metrics such as viewer location relative to the target display panel, size of the display panel, and distance to the display. The ambient lighting metrics may, for example, include metrics about light striking the display panel, reflective light levels from the display panel, and metrics (e.g., brightness, color, white point, etc.) of the field of view (or background) that the viewer/user is facing. In some embodiments, a device that includes the target display panel may include one or more forward- and/or backward-facing sensors (e.g., cameras, light sensors, etc.) that may be used to collect data from the ambient environment; the collected data may be analyzed to determine the one or more environment metrics that are then obtained by or provided to the server/encoding pipeline.

As indicated at 1104 of FIG. 11, the server/encoding pipeline may map the video content to a dynamic range for the target display panel according to the obtained information. In some embodiments, the server/encoding pipeline maps the video content to the dynamic range of the target display panel as indicated by the obtained information according to a tone mapping technique. The tone mapping technique may be adjusted according to the obtained information. For example, the dynamic range of the source data may be mapped to the bit depth of the target display panel according to the display information. As another example, tone curves and/or transfer functions used in the tone mapping technique may be modified or adjusted based upon one or more metrics including but not limited to current ambient lighting metrics at the display panel as indicated by the environment information. In some embodiments, a non-linear, global tone curve may be selected for a video frame or sequence of frames being processed in the server/encoding pipeline based at least in part upon the display and/or environment information. In some embodiments, instead of or in addition to a global tone curve, the video frames may be subdivided into multiple regions, and local tone curves may be dynamically selected for each region based at least in part upon the display and/or environment information.

As indicated at 1106 of FIG. 11, the server/encoding pipeline may map the video content to a color gamut for the target display panel according to the obtained information. In some embodiments, the server/encoding pipeline maps the video content to a color gamut of the target display panel as indicated by the obtained information according to a color gamut mapping technique. The color gamut mapping technique may be adjusted according to the obtained information. For example, the color gamut of the source data may be mapped to the bit depth of the target display panel according to the display information. As another example, curves, transfer functions, and/or lookup tables may be selected according to the particular color gamut supported by the display panel as indicated in the display information. As another example, curves, transfer functions, and/or lookup tables used in the gamut mapping technique may be modified or adjusted based upon one or more metrics including but not limited to current ambient lighting metrics at the display panel as indicated by the environment.

As indicated at 1108 of FIG. 11, the server/encoding pipeline may encode the video content and send the encoded video content to a decoding/display pipeline associated with the target display panel. The video data may, for example, be encoded by the server/encoding pipeline according to a compressed video format such as an H.264/AVC or H.265/HEVC format for delivery to the target display panel. The encoded video content may, for example, be written to a memory for access by a decoding/display pipeline associated with the target display panel, provided or streamed to the decoding/display pipeline associated with the target display panel over a wired or wireless network connection, or otherwise delivered to the decoding/display pipeline associated with the target display panel.

As indicated at 1110 of FIG. 11, the decoding/display pipeline decodes and displays the video content. Since display panel-specific tone and color gamut mapping to the dynamic range and color gamut supported by the target display panel is performed on the server/encoding side, the decoding/display pipeline may not require any changes or modifications to support HDR and/or WCG imaging.

Note that a server/encoding pipeline may apply a method as illustrated in FIG. 11 to map the same video content to two or more different target display panels according to the particular characteristics and/or environments of the display panels. For example, the server/encoding pipeline may adapt video processing and encoding functions according to the display-specific information to adapt video content to target display panels that support different bit depths, color spaces, color gamuts, and/or dynamic ranges. Also note that the order of processing in FIG. 11 and in the other flowcharts and flow diagrams is not intended to be limiting. For example, in some embodiments of the video playback method shown in FIG. 11, element 1106 (color gamut mapping) may occur before element 1104 (dynamic range mapping).

The elements of FIG. 11 are described in more detail with reference to FIGS. 1 and 10.

Referring again to FIG. 1, in embodiments of server-side adaptive video processing systems, a server/encoding pipeline 110 may map video content obtained from a source 100 to a target display panel 140. For example, the video content may be HDR and WCG video content obtained from an image sensor or camera. In some embodiments, in mapping the video content to a target display panel 140, the server/encoding pipeline 110 maps the video content to a color gamut of the target display panel 140 according to a color gamut mapping technique, and maps the video content to a dynamic range for the target display panel 140 according to a tone mapping technique. In performing the mapping, the server/encoding pipeline 110 may take into account one or more of video content, capabilities and characteristics of the target display panel 140, and information about the environment 190 at the target display panel 140, including but not limited to lighting 192 and viewer 180 information.

At least some of the information that may be used by the server/encoding pipeline 110 in mapping video content to a target display panel 140 may be captured by a device or system 120 that includes the target display panel 140 and a decoding/display pipeline 130. The system 120 may provide the captured information to a device or system that includes the server/encoding pipeline 110. For example, a system 120 that includes a target display panel 140 may also include one or more sensors 150 (cameras, light sensors, etc.) that may be used to detect environmental conditions such as ambient lighting and viewer location. The system 120 may, for example, provide information describing current environmental conditions to a remote device, system, or server that implements the server/encoding pipeline 110 via a wired or wireless network connection. However, note that a server/encoding pipeline 110 and decoding/display pipeline 130 may be implemented on the same device or system.

In some embodiments, the target display panel 140 may support HDR and WCG imaging at a bit depth (e.g., 10 bits), and the server/encoding pipeline 110 may map the video content to a dynamic range and color gamut at the bit depth as supported by the display panel 140 according to one or more current environmental factors at the target display panel 140 such as ambient lighting 192 and viewer 180 location. The server/encoding pipeline 110 encodes the mapped video content and sends the encoded content to a decoding/display pipeline 130 for the target display panel 140, which decodes and displays the video content to the target display panel 140.

Server-side adaptive video processing may, for example, be an effective and relatively simple method to get HDR, WCG video content from a server system across a network or connection to HDR- and WCG-enabled target systems 120 and display panels 140 for display, as no special mapping may be required on the decoding/display 130 side. Since display panel-specific tone and color gamut mapping to the dynamic range and color gamut supported by the target display panel 140 is performed on the server/encoding 110 side, the decoding/display pipeline 130 may not require any changes or modifications to support HDR and/or WCG imaging. Also note that a server/encoding pipeline 110 may map the same video content to two or more different target display panels 140 according to the particular characteristics and/or environments of the display panels 140.

Figure 10:
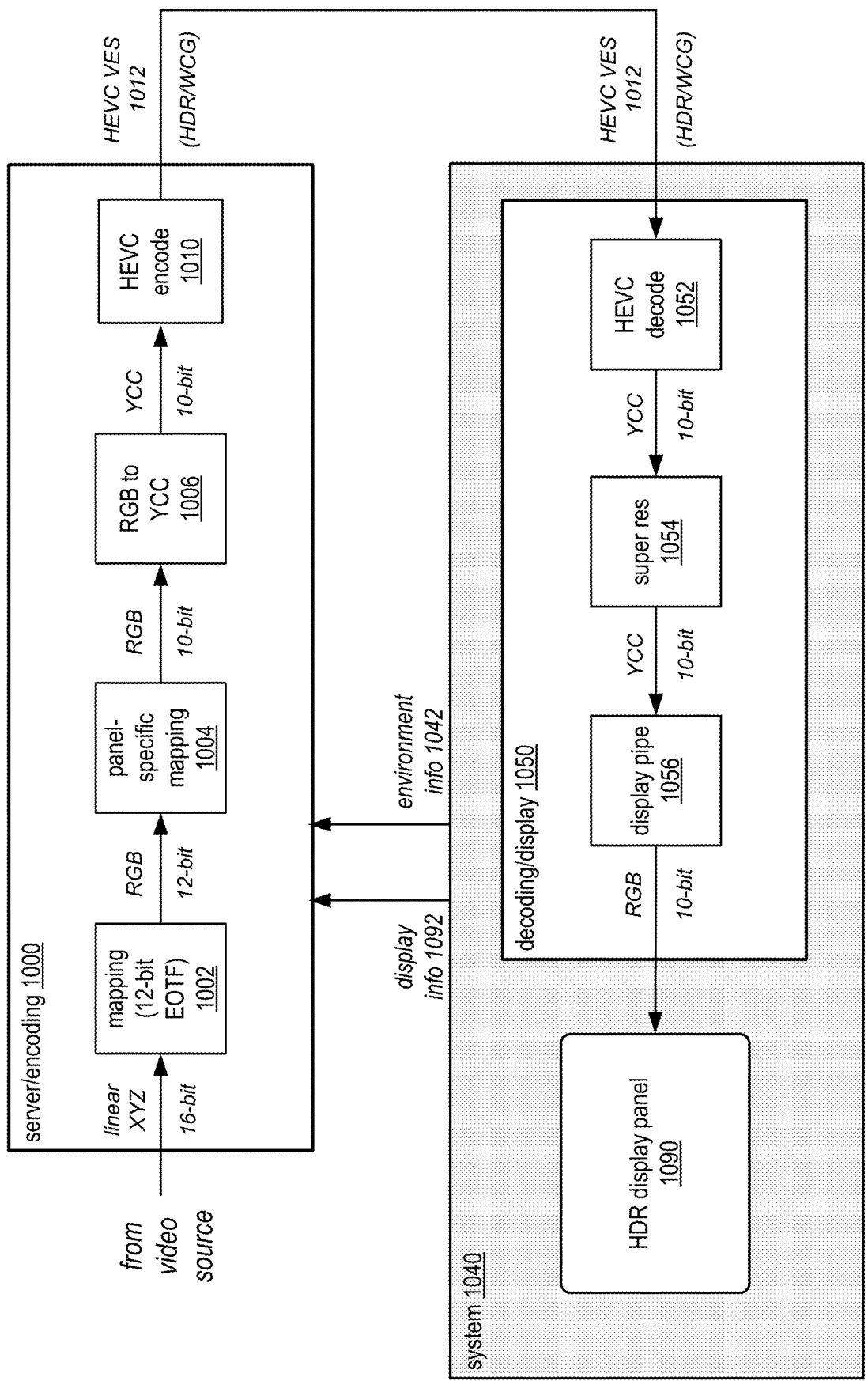
FIG. 10 illustrates an example video playback system in which a server-side encoding pipeline generates output video data adapted to a target display panel, according to some embodiments.

FIG. 10 illustrates an example video playback system in which a server-side encoding pipeline generates output video data adapted to a target display panel, according to some embodiments. In the example video playback system, a server/encoding 1000 pipeline generates output data in a wide color gamut (WCG) and high dynamic range (HDR), with mapping to the display color gamut and dynamic range performed on the server/encoding 1000 side at least in part according to information obtained from the decoding/display 1050 side. The example video playback method and system may involve H.265/HEVC encoding in WCG and HDR for distribution to at least one target display panel, with display-side decoding and processing requiring no special gamut or tone mapping for the target display panel.

FIG. 10 shows a server/encoding 1000 module or pipeline including one or more components and a decoding/display 1050 module or pipeline including one or more components. In this example, decoding/display 1050 pipeline and a target HDR display panel 1090 are shown as implemented on a system 1040. In some embodiments, one or both of server/encoding 1000 and decoding/display 1050 may be implemented on a system on a chip (SOC). In some embodiments, server/encoding 1000 and decoding/display 1050 may be implemented on the same device, system, and/or SOC. In some embodiments, server/encoding 1000 and decoding/display 1050 may be implemented on different devices, systems, or SOCs. In some embodiments, one or more server/encoding 1000 pipelines may be implemented on a device or system; the server/encoding 1000 pipelines may be configured to encode and stream video to one or more target devices or systems each implementing at least one decoding/display 1050 pipeline and at least one target display panel 1090.

In this embodiment, color gamut mapping and tone mapping for a target display panel 1090 are performed by a server/encoding 1000 pipeline, with a video encoded stream (VES) 1012 in HDR and WCG as supported by the target display panel 1090 generated on the encoding 1000 side and passed to the decoding 1050 side (e.g., to an HEVC decode 1052 component) for decoding and display. The server/encoding pipeline 1000 may obtain display information 1092 and/or environment information 1042 from the system 1040 that includes the target display panel 1090.

The input video content to the server/encoding 1000 pipeline may, for example, be encoded in (linear) CIE 1931 XYZ color space at a bit depth of 16 bits. A mapping component 1002 may apply a 12-bit electro-optical transfer function (EOTF) operation to the input linear XYZ video to map the 16-bit input data to 12-bit video data, for example into a 12-bit RGB color space. While not shown, in some embodiments, the server/encoding 1000 pipeline may analyze the input video content determine one or more content characteristics, for example how wide the dynamic range of the video content is, how much movement there is from frame to frame or scene to scene, color characteristics (e.g., color ranges), specular highlights, contrast, bright and dark regions, and so on. This content information may be used along with display information 1092 and/or environment information in processing the video content for display on the target display panel 1090.

A panel-specific mapping 1004 component may then map the 12-bit RGB video data into a color space (e.g., 10-bit RGB) of the target display panel 1090 according to the display information 1092 and/or environment information obtained from system 1040. Characteristics of the input video content may also be used in the mapping 1004. Mapping 1004 may, for example, involve performing color gamut mapping to map the color gamut of the input video content into the color gamut of the display panel 1090, and performing tone mapping to map the dynamic range of the input video content into the dynamic range of the display panel 1090.

The color gamut mapping technique may be adjusted according to the information obtained from system 1040. For example, the color gamut of the source data may be mapped to the bit depth of the target display panel according to the display information 1092. As another example, curves, transfer functions, and/or lookup tables may be selected according to the particular color gamut supported by the display panel as indicated in the display information 1092. As another example, curves, transfer functions, and/or lookup tables used in the gamut mapping technique may be modified or adjusted based upon one or more metrics including but not limited to current ambient lighting metrics at the display panel as indicated by the environment information 1042.

The tone mapping technique may also be adjusted according to the information obtained from system 1040. For example, the dynamic range of the source data may be mapped to the bit depth of the target display panel according to the display information 1092. As another example, tone curves and/or transfer functions used in the tone mapping technique may be modified or adjusted based upon one or more metrics including but not limited to current ambient lighting metrics at the display panel as indicated by the environment information 1042. In some embodiments, a non-linear, global tone curve may be selected for a video frame or sequence of frames being processed in the server/encoding pipeline based at least in part upon the display information 1092 and/or environment information 1092. In some embodiments, instead of or in addition to a global tone curve, the video frames may be subdivided into multiple regions, and local tone curves may be dynamically determined for, or otherwise selected for, each region based at least in part upon the display information 1092 and/or environment information 1092.

In some embodiments, panel-specific mapping 1004 may be performed at least in part by an Image Signal Processor (ISP). In some embodiments, one or more components of the ISP (e.g., 3D color lookup tables (CLUTS)) may be used in performing panel-specific mapping 1004. However, panel-specific mapping 1004 may instead or in addition be performed by or in one or more GPUs.

In some embodiments, an RGB to YCC 1006 component may convert the 10-bit RGB output to a 10-bit YCC format for encoding. An H.265/HEVC encoder component 1010 encodes the 10-bit YCC video data to generate HEVC VES 1012 in HDR and WCG as supported by the target display panel 1090 at a bit depth of 10 bits.

At decoding 1050, an HEVC decode component 1052 decodes HEVC compressed video stream 1012 to generate 10-bit data in the YCC color space. A super-resolution technique 1054 may be performed on the data, and the 10-bit YCC data may then be passed to a display pipe 1058 for final processing to generate display output data, for example 10-bit RGB data, at the bit depth, color gamut, and dynamic range of the target HDR display panel 1090.

Note that the various video formats, color spaces, bit depths, and so on shown in FIG. 10 are given by way of example and are not intended to be limiting. For example, other color spaces than CIE 1931 XYZ may be used for input video. As another example, in some embodiments, encoding and decoding may be performed according to other encoding formats than the H.265/HEVC format. As another example, the color space of the target display panel 1090 into which the server/encoding pipeline 1000 maps 1004 the video content may be any of a variety of color spaces, including but not limited to various RGB, Rec. 709, P3 DCI D65, and Rec. 2020 color spaces.

Non-Linear Display Brightness Adjustment

Embodiments of display brightness adjustment apparatus and methods are described in which the average brightness of a display may be scaled up or down using a non-linear function, for example a piecewise linear function. The non-linear scaling may be performed automatically, for example in response to ambient light level as detected by one or more sensor(s) as illustrated in FIG. 1, but may also be applied in response to a user adjustment to a control 160 as illustrated in FIG. 1, for example via a brightness knob, slider, or button, or via a graphical user interface (GUI) brightness control. The non-linear brightness adjustment may be performed globally, or alternatively may be performed on local regions of an image or display panel.

Figure 14:
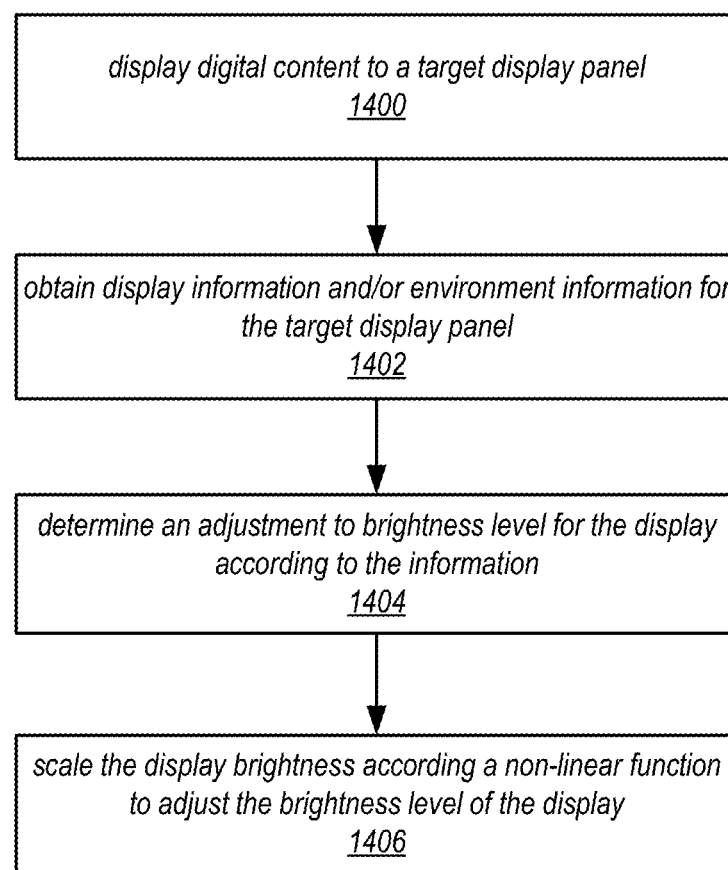
FIG. 14 is a flowchart of a non-linear brightness adjustment method, according to at least some embodiments.

FIG. 14 is a flowchart of a non-linear brightness adjustment method, according to at least some embodiments. As illustrated at 1400 of FIG. 14, digital content (e.g., video content) may be displayed to a target display panel. However, note that other digital image content may instead or also be displayed to the display panel. The display panel may display the content at a brightness level and contrast level. The display panel may be, but is not necessarily, a high dynamic range (HDR) enabled display device, and the digital content may be HDR content.

As indicated at 1402 of FIG. 14, display information and/or environment information may be obtained for the target display panel, for example by a brightness adjustment module of the display panel or of a device that includes the panel. In some embodiments, the display information may include an indication of a brightness level setting for the display panel. In some embodiments, the brightness level for the display may be set according to a user adjustment to a control, for example a physical brightness knob, slider, or button, or a graphical user interface (GUI) brightness control. In some embodiments, the environment information may include one or more ambient lighting metrics, and a brightness level for the display may be determined or adjusted according to the ambient lighting metric(s). As indicated at 1404 of FIG. 14, an adjustment for the brightness level of the display may be determined according to the information. For example, if the user moves a brightness slider up or down, a corresponding change in brightness level may be determined according to the movement. As another example, if ambient lighting gets darker or brighter, a corresponding change in brightness level may be determined according to the change in ambient lighting. For example, if the ambient light is brightening, then the display brightness may need to be increased. Conversely, in dim lighting conditions, display brightness may need to be decreased.

Figure 13:
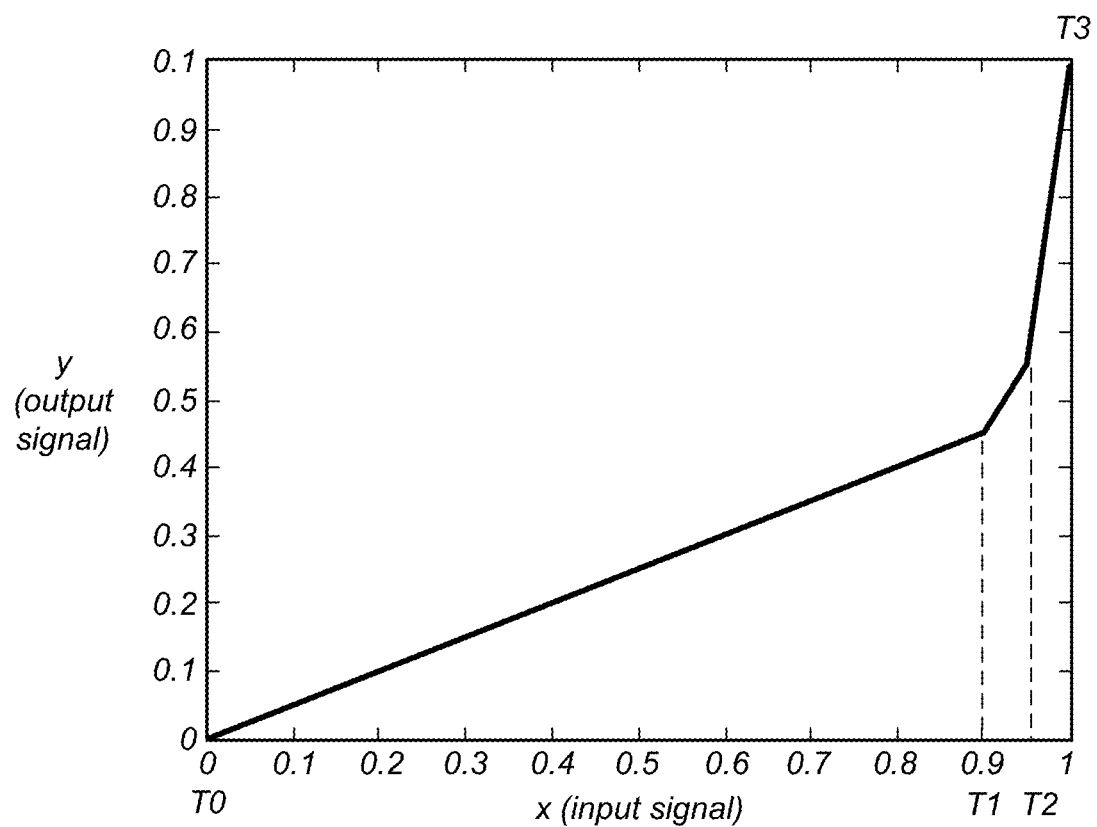
FIG. 13 illustrates the input-output relationship of a non-linear brightness adjustment function, according to at least some embodiments.

As indicated at 1406 of FIG. 14, the display brightness may then be scaled up or down according to a non-linear function to adjust the brightness level of the display. For example, in some embodiments, the non-linear function may be applied to the input signal to generate the output signal adjusted according to the current brightness level using a lookup table; however, other techniques may be used. In some embodiments, the input signal is separated into luminance (luma) and chrominance (chroma) components, and the non-linear function is applied to the luma component of the signal. An example non-linear function as applied to an input signal to generate an output signal is illustrated in FIG. 13. When applying the non-linear function to scale down brightness, the contrast may not be reduced in the output signal so that the dynamic range and highlights are preserved.

In some embodiments, the display brightness may be adjusted globally using a global, non-linear function. In some embodiments, the display brightness may be adjusted separately for two or more regions of the display, with potentially a different non-linear function or variation of a non-linear function applied to the signal in different regions.

The elements of FIG. 14 are described in more detail with reference to FIGS. 12 and 13.

Display brightness adjustment techniques typically scale brightness up or down using a linear function, so that both average brightness and contrast are changed at the same ratio. For example, FIG. 12 shows the linear input-output relationship of brightness (luma) adjustment with a scaling factor of 0.5. Axis x is the input signal, and axis y is the output signal, and both are normalized to [0, 1]. The corresponding linear equation is:

$$y=kx$$

Figure 12:
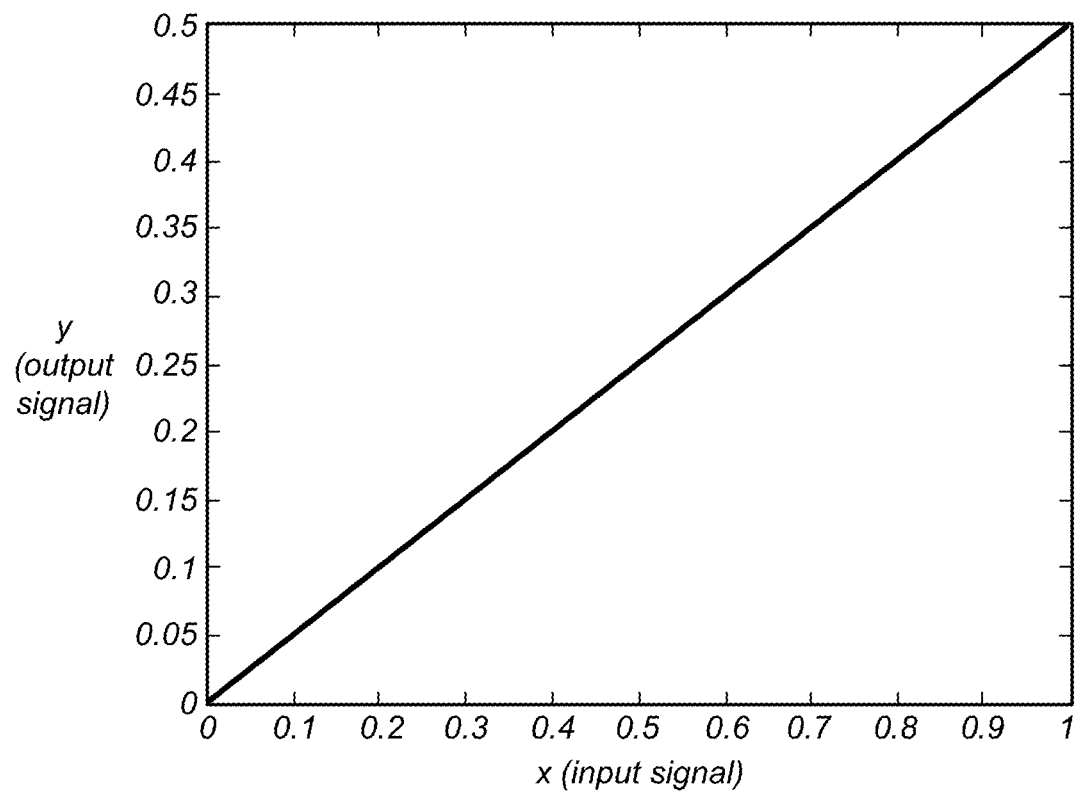
FIG. 12 shows the input-output relationship of brightness adjustment with scaling factor of 0.5.

A problem with linear brightness adjustment as illustrated in FIG. 12 is that when the average brightness is reduced, so is the contrast. As a result, the displayed image/video becomes less vivid. Embodiments of display brightness adjustment apparatus and methods as described herein may implement a non-linear (e.g., a piecewise linear) brightness adjustment function in which bright adjustments only change the average, while keeping maximal dynamic range unchanged. A non-limiting example embodiment of a non-linear brightness adjustment function is shown in FIG. 13, which illustrates the input-output relationship of the brightness (luma) adjustment function according to at least some embodiments. Comparing FIG. 13 to the straight line in FIG. 12, the brightness adjustment function is a piecewise linear function with parameters T0 to T3. In FIG. 13, T0 is 0, T1 is set to 0.9, and T2 is set to 0.95, and T3 is 1. Note that the slope increases from (T0, T1) to (T1, T2), and increases again from (T1, T2) to (T2, T3). However, note that these values are examples, and are not intended to be limiting. In this example piecewise non-linear function as shown in FIG. 13, the corresponding equations are:

$$y=k_0 x \text{ when } 0<=x<T_1$$

$$y=k_1(x-T_1)+k_0 T_1 \text{ when } T_1<=x<T_2$$

$$y=k_2(x-T_2)+k_1(T_2-T_1)+k_0 T_1 \text{ when } T_2<=x<=1$$

In at least some embodiments, when applying a non-linear function such as a piecewise linear function as illustrated in FIG. 13 to scale down brightness, the contrast of the output signal may not be reduced so that the dynamic range and highlights are preserved. Linear scaling, as illustrated in FIG. 12, may negatively affect image quality. For example, when performing linear adjustment as illustrated in FIG. 12, dynamic range is typically scaled down as well. Thus, instead of performing a linear adjustment as illustrated in FIG. 12, embodiments may scale down only the average brightness using a non-linear scaling function as illustrated in FIG. 13, while not correspondingly reducing the contrast and dynamic range, thus preserving highlights. While FIG. 13 shows a piecewise linear scaling function, other non-linear functions such as quadratic functions or curves may be used.

As noted above, when applying a non-linear function such as a piecewise linear function as illustrated in FIG. 13 to scale down brightness, the contrast of the output signal may not be reduced so that the dynamic range and highlights are preserved. However, in some cases, contrast may need to be scaled down as well as brightness; however, the contrast is not scaled down as much and/or as fast as the brightness to help preserve the dynamic range of the displayed image. In other words, in contrast to linear scaling techniques as illustrated in FIG. 12 in which average brightness and contrast are changed at the same ratio, using embodiments of the non-linear brightness scaling techniques as illustrated in FIG. 13, contrast is not affected by adjustments to brightness, or is affected differently than brightness in response to brightness adjustments.

In some embodiments, the non-linear scaling of brightness, and possibly also of contrast, may be performed automatically according to the ambient adaptive rendering methods as described herein, for example in response to change in ambient light levels as detected by a sensor or sensors as illustrated in FIG. 1. In some embodiments, instead of or in addition to automatic scaling, the non-linear scaling may be applied in response to a user adjustment to a control 160 as illustrated in FIG. 1, for example via a brightness knob, slider, or graphic user interface (GUI) brightness control.

As shown in FIG. 13, a piecewise linear function may be used in some embodiments. However, other functions may be used, for example a curve function, a quadratic function, etc. However, the general shape of the curve in FIG. 13 may typically be maintained no matter what type of function is used. In this shape, at the beginning of the signal, the slope is slow or low, and becomes faster or steeper; this shape may, for example, help to maintain highlights in the image. Note, however, that other general curve shapes may be used in some embodiments.

In some embodiments, instead of or in addition to using a global non-linear scaling function, the non-linear scaling function may be applied and varied in different regions of a display screen, image, or video frame. In some embodiments, all brightness values may be adjusted globally in an image according to the same non-linear scaling function. However, in some embodiments, local brightness adjustments may be performed instead of or in addition to global adjustments. In local adjustment of the non-linear scaling function, different non-linear models or functions may be applied, or may be applied differently, in different areas of an image or display.

Embodiments of display brightness adjustment techniques as described herein may, for example, be implemented in devices or systems that include one or more display devices. Displays or display devices may include display screens or panels that are integrated into other devices including but not limited to smartphones, cell- phones, PDAs, tablet or pad devices, multifunction devices, computing devices, laptop computers, notebook computers, netbook computers, desktop computers, and so on. Display devices may also include video monitors, projectors, or in general any device that can display or project digital images and/or digital video. The display brightness adjustment techniques may, for example be implemented for displays including but not limited to LED (light emitting diode), OLED (organic light emitting diode), or LCD (liquid crystal display) technology displays, with backlight local dimming.

The non-linear brightness adjustment methods may, for example, be implemented in a brightness adjustment module or component of a display device or other device or apparatus. FIGS. 15 through 19 show non-limiting examples of devices in which embodiments of the non-linear display brightness adjustment module or methods may be implemented. A display device, or a device or system that includes a display device, may include hardware and/or software (e.g., a brightness adjustment module) that implements at least some of the functionality for non-linear display brightness control as described herein. In some embodiments, a display device, or a device that includes a display panel or screen, may implement a display pipeline that receives and processes compressed images (i.e., decodes) such as video images for display to the panel or screen, for example according to the adaptive video processing methods described herein, and component(s) of the display pipeline may implement at least some of the functionality as described herein for non-linear display brightness adjustment. In some embodiments, a display backend component of a display pipeline may implement the non-linear display brightness adjustment functionality. In some embodiments, the non-linear display brightness adjustment functionality may be implemented in or by a brightness adjustment module or component of the display backend. FIGS. 3 and 4 illustrate an example display pipeline and display backend that may implement the non-linear display brightness adjustment functionality as described herein.

In some embodiments, at least some of the functionality as described herein for non-linear display brightness adjustment may be implemented by one or more components or modules of a system on a chip (SOC) that may be used in devices including but not limited to multifunction devices, smartphones, pad or tablet devices, and other portable computing devices such as laptop, notebook, and netbook computers.

Example Devices and Apparatus

FIGS. 15 through 19 show non-limiting examples of devices and apparatus in or with which embodiments or components of the various digital video or image processing and display methods and apparatus as described herein may be implemented. FIG. 15 illustrates an example SOC, and FIG. 16 illustrates an example device implementing an SOC. FIG. 17 illustrates an example computer system that may implement the methods and apparatus described herein. FIGS. 18 and 19 illustrate example multifunction devices that may implement the methods and apparatus described herein.

Example System on a Chip (SOC)

Turning now to FIG. 15, a block diagram of one embodiment of a system-on-a-chip (SOC) 8000 that may be used in embodiments. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040C (more briefly, "peripherals"), a memory controller (MC) 8030, and a communication fabric 8010. The components 8020, 8030, 8040A-8040C, may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders or codecs, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding re-access of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 15, such as within the CPU complex 8020) may vary from embodiment to embodiment. There may be more or fewer of each component/subcomponent than the number shown in FIG. 15.

FIG. 16 a block diagram of one embodiment of a system 9000 that includes at least one instance of an SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

Example Computer System

FIG. 17 illustrates an example computer system 2900 that may be configured to execute any or all of the embodiments described above. In different embodiments, computer system 2900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, application server, storage device, a video recording device, a peripheral device such as a switch, modem, router, or in general any type of computing or electronic device.

Various embodiments as described herein, may be executed in one or more computer systems 2900, which may interact with various other devices. Note that any component, action, or functionality described above with respect to FIGS. 1 through 16 may be implemented on one or more computers configured as computer system 2900 of FIG. 17, according to various embodiments. In the illustrated embodiment, computer system 2900 includes one or more processors 2910 coupled to a system memory 2920 via an input/output (I/O) interface 2930. Computer system 2900 further includes a network interface 2940 coupled to I/O interface 2930, and one or more input/output devices or components 2950, such as cursor control 2960, keyboard 2970, display(s) 2980, camera(s) 2990, and sensor(s) 2992 including but not limited to light sensors and motion detectors. In some cases, it is contemplated that embodiments may be implemented using a single instance of computer system 2900, while in other embodiments multiple such systems, or multiple nodes making up computer system 2900, may be configured to host different portions or instances of embodiments. For example, in one embodiment some elements may be implemented via one or more nodes of computer system 2900 that are distinct from those nodes implementing other elements.

In various embodiments, computer system 2900 may be a uniprocessor system including one processor 2910, or a multiprocessor system including several processors 2910 (e.g., two, four, eight, or another suitable number). Processors 2910 may be any suitable processor capable of executing instructions. For example, in various embodiments processors 2910 may be general-purpose or embedded processors implementing any of a variety of instruction set architectures (ISAs), such as the x829, PowerPC, SPARC, or MIPS ISAs, or any other suitable ISA. In multiprocessor systems, each of processors 2910 may commonly, but not necessarily, implement the same ISA.

System memory 2920 may be configured to store program instructions 2922 and/or data accessible by processor 2910. In various embodiments, system memory 2920 may be implemented using any suitable memory technology, such as static random access memory (SRAM), synchronous dynamic RAM (SDRAM), nonvolatile/Flash-type memory, or any other type of memory. In the illustrated embodiment, program instructions 2922 may be configured to implement any of the functionality described herein. Additionally, memory 2920 may include any of the information or data structures described herein. In some embodiments, program instructions and/or data may be received, sent or stored upon different types of computer-accessible media or on similar media separate from system memory 2920 or computer system 2900. While computer system 2900 is described as implementing the functionality of functional blocks of previous Figures, any of the functionality described herein may be implemented via such a computer system.

In one embodiment, I/O interface 2930 may be configured to coordinate I/O traffic between processor 2910, system memory 2920, and any peripheral devices in the device, including network interface 2940 or other peripheral interfaces, such as input/output devices 2950. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices attached to a network 2985 (e.g., carrier or agent devices) or between nodes of computer system 2900. Network 2985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2950 may, in some embodiments, include one or more display terminals, keyboards, keypads, touchpads, scanning devices, voice or optical recognition devices, or any other devices suitable for entering or accessing data by one or more computer systems 2900. Multiple input/output devices 2950 may be present in computer system 2900 or may be distributed on various nodes of computer system 2900. In some embodiments, similar input/output devices may be separate from computer system 2900 and may interact with one or more nodes of computer system 2900 through a wired or wireless connection, such as over network interface 2940.

As shown in FIG. 17, memory 2920 may include program instructions 2922, which may be processor-executable to implement any element or action described above. In one embodiment, the program instructions may implement the methods described above. In other embodiments, different elements and data may be included. Note that data may include any data or information described above.

Those skilled in the art will appreciate that computer system 2900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2900 may be transmitted to computer system 2900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Multifunction Device Examples

FIG. 18 illustrates a block diagram of a portable multifunction device in accordance with some embodiments. In some embodiments, the device is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 2100 may include memory 2102 (which may include one or more computer readable storage mediums), memory controller 2122, one or more processing units (CPU's) 2120, peripherals interface 2118, RF circuitry 2108, audio circuitry 2110, speaker 2111, touch-sensitive display system 2112, microphone 2113, input/output (I/O) subsystem 2106, other input control devices 2116, and external port 2124. Device 2100 may include one or more optical sensors or cameras 2164. These components may communicate over one or more communication buses or signal lines 2103.

It should be appreciated that device 2100 is only one example of a portable multifunction device, and that device 2100 may have more or fewer components than shown, may combine two or more components, or may have a different configuration or arrangement of the components. The various components shown in FIG. 18 may be implemented in hardware, software, or a combination of hardware and software, including one or more signal processing and/or application specific integrated circuits.

Memory 2102 may include high-speed random access memory and may also include non-volatile memory, such as one or more magnetic disk storage devices, flash memory devices, or other non-volatile solid-state memory devices. Access to memory 2102 by other components of device 2100, such as CPU 2120 and the peripherals interface 2118, may be controlled by memory controller 2122.

Peripherals interface 2118 can be used to couple input and output peripherals of the device to CPU 2120 and memory 2102. The one or more processors 2120 run or execute various software programs and/or sets of instructions stored in memory 2102 to perform various functions for device 2100 and to process data.

In some embodiments, peripherals interface 2118, CPU 2120, and memory controller 2122 may be implemented on a single chip, such as chip 2104. In some other embodiments, they may be implemented on separate chips.

RF (radio frequency) circuitry 2108 receives and sends RF signals, also called electromagnetic signals. RF circuitry 2108 converts electrical signals to/from electromagnetic signals and communicates with communications networks and other communications devices via the electromagnetic signals. RF circuitry 2108 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 2108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2110, speaker 2111, and microphone 2113 provide an audio interface between a user and device 2100. Audio circuitry 2110 receives audio data from peripherals interface 2118, converts the audio data to an electrical signal, and transmits the electrical signal to speaker 2111. Speaker 2111 converts the electrical signal to human-audible sound waves. Audio circuitry 2110 also receives electrical signals converted by microphone 2113 from sound waves. Audio circuitry 2110 converts the electrical signal to audio data and transmits the audio data to peripherals interface 2118 for processing. Audio data may be retrieved from and/or transmitted to memory 2102 and/or RF circuitry 2108 by peripherals interface 2118. In some embodiments, audio circuitry 2110 also includes a headset jack. The headset jack provides an interface between audio circuitry 2110 and removable audio input/output peripherals, such as output-only headphones or a headset with both output (e.g., a headphone for one or both ears) and input (e.g., a microphone).

I/O subsystem 2106 couples input/output peripherals on device 2100, such as touch screen 2112 and other input control devices 2116, to peripherals interface 2118. I/O subsystem 2106 may include display controller 2156 and one or more input controllers 2160 for other input control devices 2116. The one or more input controllers 2160 receive/send electrical signals from/to other input control devices 2116. The other input control devices 2116 may include physical buttons (e.g., push buttons, rocker buttons, etc.), dials, slider switches, joysticks, click wheels, and so forth. In some alternate embodiments, input controller(s) 2160 may be coupled to any (or none) of the following: a keyboard, infrared port, USB port, and a pointer device such as a mouse. The one or more buttons may include an up/down button for volume control of speaker 2111 and/or microphone 2113. The one or more buttons may include a push button.

Touch-sensitive display 2112 provides an input interface and an output interface between the device and a user. Display controller 2156 receives and/or sends electrical signals from/to touch screen 2112. Touch screen 2112 displays visual output to the user. The visual output may include graphics, text, icons, video, and any combination thereof (collectively termed "graphics"). In some embodiments, some or all of the visual output may correspond to user-interface objects.

Touch screen 2112 has a touch-sensitive surface, sensor or set of sensors that accepts input from the user based on haptic and/or tactile contact. Touch screen 2112 and display controller 2156 (along with any associated modules and/or sets of instructions in memory 2102) detect contact (and any movement or breaking of the contact) on touch screen 2112 and converts the detected contact into interaction with user-interface objects (e.g., one or more soft keys, icons, web pages or images) that are displayed on touch screen 2112. In an example embodiment, a point of contact between touch screen 2112 and the user corresponds to a finger of the user.

Touch screen 2112 may use LCD (liquid crystal display) technology, LPD (light emitting polymer display) technology, or LED (light emitting diode) technology, although other display technologies may be used in other embodiments. Touch screen 2112 and display controller 2156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2112. In an example embodiment, projected mutual capacitance sensing technology is used, such as that found in the iPhone®, iPod Touch®, and iPad® from Apple Inc. of Cupertino, Calif.

Touch screen 2112 may have a video resolution in excess of 100 dpi. In some embodiments, the touch screen has a video resolution of approximately 160 dpi. The user may make contact with touch screen 2112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 2112, device 2100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2112 or an extension of the touch-sensitive surface formed by the touch screen.

Device 2100 also includes power system 2162 for powering the various components. Power system 2162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 2100 may also include one or more optical sensors or cameras 2164. FIG. 18 shows an optical sensor coupled to optical sensor controller 2158 in I/O subsystem 2106. Optical sensor 2164 may, for example, include charge-coupled device (CCD) or complementary metal-oxide semiconductor (CMOS) phototransistors or photosensors. Optical sensor 2164 receives light from the environment, projected through one or more lenses, and converts the light to data representing an image. In conjunction with imaging module 2143 (also called a camera module), optical sensor 2164 may capture still images and/or video sequences. In some embodiments, at least one optical sensor may be located on the back of device 2100, opposite touch screen display 2112 on the front of the device. In some embodiments, the touch screen display may be used as a viewfinder for still and/or video image acquisition. In some embodiments, at least one optical sensor may instead or also be located on the front of the device.

Device 2100 may also include one or more proximity sensors 2166. FIG. 18 shows proximity sensor 2166 coupled to peripherals interface 2118. Alternately, proximity sensor 2166 may be coupled to input controller 2160 in I/O subsystem 2106. In some embodiments, the proximity sensor turns off and disables touch screen 2112 when the multifunction device is placed near the user's ear (e.g., when the user is making a phone call).

Device 2100 may also include one or more orientation sensors 2168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2100. In some embodiments, the one or more orientation sensors include any combination of orientation/rotation sensors. FIG. 18 shows the one or more orientation sensors 2168 coupled to peripherals interface 2118. Alternately, the one or more orientation sensors 2168 may be coupled to an input controller 2160 in I/O subsystem 2106. In some embodiments, information is displayed on the touch screen display in a portrait view or a landscape view based on an analysis of data received from the one or more orientation sensors.

In some embodiments, device 2100 may also include one or more other sensors (not shown) including but not limited to ambient light sensors and motion detectors. These sensors may be coupled to peripherals interface 2118 or, alternately, may be coupled to an input controller 2160 in I/O subsystem 2106. For example, in some embodiments, device 2100 may include at least one forward-facing (away from the user) and at least one backward-facing (towards the user) light sensors that may be used to collect ambient lighting metrics from the environment of the device 2100 for use in video and image capture, processing, and display applications.

In some embodiments, the software components stored in memory 2102 include operating system 2126, communication module 2128, contact/motion module (or set of instructions) 2130, graphics module 2132, text input module 2134, Global Positioning System (GPS) module 2135, and applications 2136. Furthermore, in some embodiments memory 2102 stores device/global internal state 2157. Device/global internal state 2157 includes one or more of: active application state, indicating which applications, if any, are currently active; display state, indicating what applications, views or other information occupy various regions of touch screen display 2112; sensor state, including information obtained from the device's various sensors and input control devices 2116; and location information concerning the device's location and/or attitude.

Operating system 2126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2128 facilitates communication with other devices over one or more external ports 2124 and also includes various software components for handling data received by RF circuitry 2108 and/or external port 2124. External port 2124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 2130 may detect contact with touch screen 2112 (in conjunction with display controller 2156) and other touch sensitive devices (e.g., a touchpad or physical click wheel). Contact/motion module 2130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2130 and display controller 2156 detect contact on a touchpad.

Contact/motion module 2130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2132 includes various software components for rendering and displaying graphics on touch screen 2112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2132 stores data representing graphics to be used. Each graphic may be assigned a corresponding code. Graphics module 2132 receives, from applications etc., one or more codes specifying graphics to be displayed along with, if necessary, coordinate data and other graphic property data, and then generates screen image data to output to display controller 2156.

Text input module 2134, which may be a component of graphics module 2132, provides soft keyboards for entering text in various applications that need text input.

GPS module 2135 determines the location of the device and provides this information for use in various applications (e.g., to telephone module 2138 for use in location-based dialing, to camera module 2143 as picture/video metadata, and to applications that provide location-based services such as map/navigation applications).

Applications 2136 may include one or more of, but are not limited to, the following modules (or sets of instructions), or a subset or superset thereof:
  telephone module 2138;
  video conferencing module 2139;
  camera module 2143 for still and/or video imaging;
  image management module 2144;
  browser module 2147;
  search module 2151;
  video and music player module 2152, which may be made up of a video player module and a music player module; and/or
  online video module 2155.

Examples of other applications 2136 that may be stored in memory 2102 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 2108, audio circuitry 2110, speaker 2111, microphone 2113, touch screen 2112, display controller 2156, contact module 2130, graphics module 2132, and text input module 2134, telephone module 2138 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2108, audio circuitry 2110, speaker 2111, microphone 2113, touch screen 2112, display controller 2156, optical sensor 2164, optical sensor controller 2158, contact/motion module 2130, graphics module 2132, text input module 2134, and telephone module 2138, videoconferencing module 2139 includes executable instructions to initiate, conduct, and terminate a video conference between a user and one or more other participants in accordance with user instructions.

In conjunction with touch screen 2112, display controller 2156, optical sensor(s) 2164, optical sensor controller 2158, contact/motion module 2130, graphics module 2132, and image management module 2144, camera module 2143 includes executable instructions to capture still images or video (including a video stream) and store them into memory 2102, modify characteristics of a still image or video, or delete a still image or video from memory 2102.

In conjunction with touch screen 2112, display controller 2156, contact/motion module 2130, graphics module 2132, text input module 2134, and camera module 2143, image management module 2144 includes executable instructions to arrange, modify (e.g., edit), or otherwise manipulate, label, delete, present (e.g., in a digital slide show or album), and store still and/or video images.

In conjunction with RF circuitry 2108, touch screen 2112, display system controller 2156, contact/motion module 2130, graphics module 2132, and text input module 2134, browser module 2147 includes executable instructions to browse the Internet in accordance with user instructions, including searching, linking to, receiving, and displaying web pages or portions thereof, as well as attachments and other files linked to web pages.

In conjunction with touch screen 2112, display system controller 2156, contact/motion module 2130, graphics module 2132, and text input module 2134, search module 2151 includes executable instructions to search for text, music, sound, image, video, and/or other files in memory 2102 that match one or more search criteria (e.g., one or more user-specified search terms) in accordance with user instructions.

In conjunction with touch screen 2112, display system controller 2156, contact/motion module 2130, graphics module 2132, audio circuitry 2110, speaker 2111, RF circuitry 2108, and browser module 2147, video and music player module 2152 includes executable instructions that allow the user to download and play back recorded music and other sound files stored in one or more file formats, such as MP3 or AAC files, and executable instructions to display, present or otherwise play back videos (e.g., on touch screen 2112 or on an external, connected display via external port 2124). In some embodiments, device 2100 may include the functionality of an MP3 player, such as an iPod (trademark of Apple Inc.).

In conjunction with touch screen 2112, display system controller 2156, contact/motion module 2130, graphics module 2132, audio circuitry 2110, speaker 2111, RF circuitry 2108, text input module 2134, and browser module 2147, online video module 2155 includes instructions that allow the user to access, browse, receive (e.g., by streaming and/or download), play back (e.g., on the touch screen or on an external, connected display via external port 2124), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 2102 may store a subset of the modules and data structures identified above. Furthermore, memory 2102 may store additional modules and data structures not described above.

In some embodiments, device 2100 is a device where operation of a predefined set of functions on the device is performed exclusively through a touch screen and/or a touchpad. By using a touch screen and/or a touchpad as the primary input control device for operation of device 2100, the number of physical input control devices (such as push buttons, dials, and the like) on device 2100 may be reduced.

The predefined set of functions that may be performed exclusively through a touch screen and/or a touchpad include navigation between user interfaces. In some embodiments, the touchpad, when touched by the user, navigates device 2100 to a main, home, or root menu from any user interface that may be displayed on device 2100. In such embodiments, the touchpad may be referred to as a "menu button." In some other embodiments, the menu button may be a physical push button or other physical input control device instead of a touchpad.

FIG. 19 illustrates a portable multifunction device 2100 having a touch screen 2112 in accordance with some embodiments. The touch screen may display one or more graphics within user interface (UI) 2200. In at least some embodiments of a device 2100, a user may select one or more of the graphics by making a gesture on the graphics, for example, with one or more fingers 2202 (not drawn necessarily drawn to scale in the figure) or one or more styluses 2203 (not necessarily drawn to scale in the figure).

Device 2100 may also include one or more physical buttons, such as a "home" or menu button 2204. As described previously, menu button 2204 may be used to navigate to any application 2136 in a set of applications that may be executed on device 2100. Alternatively, in some embodiments, the menu button is may be implemented as a soft key in a GUI displayed on touch screen 2112.

In one some embodiments, device 2100 includes touch screen 2112, home or menu button 2204, push button 2206 for powering the device on/off and locking the device, volume adjustment button(s) 2208, Subscriber Identity Module (SIM) card slot 2210, head set jack 2212, and docking/charging external port 2124. Push button 2206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2100 also may accept verbal input for activation or deactivation of some functions through microphone 2113.

Device 2100 may also include one or more cameras 2164. A camera 2164 may, for example, include charge-coupled device (CCD) or complementary metal-oxide semiconductor (CMOS) phototransistors or photosensors. A camera 2164 receives light from the environment, projected through one or more lenses, and converts the light to data representing an image or video frame. In some embodiments, at least one camera 2164 may be located on the back of device 2100, opposite touch screen display 2112 on the front of the device. In some embodiments, at least one camera 2164 may instead or also located on the front of the device with the touch screen display 2112, for example so that the user's image may be obtained for videoconferencing while the user views the other video conference participants on the touch screen display 2112. In some embodiments, at least one camera 2164 may be located on the front of the device 2100, and at least one camera 2164 may be located on the back of the device 2100. In some embodiments, the touch screen display 2112 may be used as a viewfinder and/or user interface for still image and/or video sequence acquisition applications.

Device 2100 may include video and image processing hardware and/or software, including but not limited to video encoding and/or decoding components, codecs, modules, or pipelines, that may be used to capture, process, convert, compress, decompress, store, modify, transmit, display, and otherwise manage and manipulate still images and/or video frames or video sequences captured via camera 2164 or otherwise acquired (e.g., via a network interface). In some embodiments, device 2100 may also include one or more light or other sensors that may be used to collect ambient lighting or other metrics from the environment of the device 2100 for use in video and image capture, processing, and display.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
an encoding pipeline configured to:
receive video data for a video from one or more sources; and
for each of one or more display panels:
obtain one or more characteristics of the display panel, wherein the one or more characteristics comprise a dynamic range of the display panel;
obtain one or more environment metrics indicating current ambient environmental conditions at and external to the display panel;
prior to encoding the video data according to a compressed video format to generate encoded video content, process the video data to generate adapted video content adapted to the current ambient environmental conditions and the dynamic range of the display panel, said process the video data based on:
one or more characteristics of the video data, the one or more characteristics of the display panel including the dynamic range of the display panel, and
the one or more environment metrics indicating the current ambient environmental conditions at and external to the display panel;

wherein to process the video data the encoding pipeline is configured to apply tone mapping to the video data, the tone mapping adjusted according to the dynamic range of the display panel and at least one of the one or more environment metrics to adapt luminance of the video data to the current ambient environmental conditions as indicated by the environment metrics;
encode the adapted video content according to the compressed video format to generate the encoded video content; and
provide the encoded video content to a decoding pipeline associated with the respective display panel.

2. The system as recited in claim 1, wherein the one or more characteristics of the display panel include a color gamut of the display panel, and wherein, to process the video data, the encoding pipeline is configured to apply color gamut mapping to the video data to generate video content in the color gamut of the display panel.

3. The system as recited in claim 2, wherein the encoding pipeline is configured to adjust color gamma mapping as applied to the video data according to at least one of the one or more environment metrics to adapt color of the video content to the current ambient environmental conditions as indicated by the environment metrics.

4. The system as recited in claim 1, wherein the one or more characteristics of the display panel include a color space and a bit depth of the display panel, and wherein, to process the video data, the encoding pipeline is configured to map the video data to the color space and the bit depth of the display panel.

5. The system of claim 4, wherein mapping the video data to the color space and the bit depth of the display panel comprises selecting one or more of color curves, transfer functions, or lookup tables based at least on the characteristics of the display panel.

6. The system of claim 5, wherein the encoding pipeline is configured to adjust one or more of the color curves, transfer functions, or lookup tables based at least on the current ambient environmental conditions.

7. The system as recited in claim 1, further comprising the decoding pipeline associated with the respective display panel, configured to:
decode and process the encoded video content to obtain the adapted video content in a color space of the respective display panel; and
output the adapted video content to the respective display panel for display.

8. The system as recited in claim 1, wherein at least one of the one or more display panels is a component of a same device as the encoding pipeline.

9. The system as recited in claim 1, wherein at least one of the one or more display panels is a component of a different device than the encoding pipeline.

10. The system as recited in claim 1, wherein the one or more sources include a video camera on a same device as the encoding pipeline.

11. The system as recited in claim 1, wherein the video data is high dynamic range (HDR) video data, wherein at least one of the one or more display panels is an HDR-enabled display panel, and wherein the adapted video content for the HDR-enabled display panel is HDR video content rendered according to the one or more characteristics of the HDR-enabled display panel.

12. The system as recited in claim 1, wherein the video data is wide color gamut (WCG) video data, wherein at least one of the one or more display panels supports WCG imaging, and wherein the adapted video content for the at least one of the one or more display panels is WCG video content rendered according to the one or more characteristics of the at least one of the one or more display panel.

13. The system of claim 1, wherein the encoding pipeline is configured to, for each of the one or more display panels:
obtain a field of view that the display panel subtends, the field of view corresponding to a location of a human viewer with respect to the display panel.

14. The system of claim 1, wherein at least one of the current ambient environmental conditions include a location of a human viewer with respect to the display panel.

15. The system of claim 1, wherein the one or more characteristics of the display panel further include one or more of measured characteristics for the display panel, wherein the one or more measured characteristics include one or more of a measured response characteristic, a light leakage characteristic, or a reflective light characteristic for the display panel.

16. The system of claim 1, wherein the one or more environment metrics include one or more of a location of a viewer relative to the display panel, a size of the display panel, and a distance of the viewer from the display panel.

17. The system of claim 1, wherein applying tone mapping to the video data further comprises:
adjusting one or more of tone curves or transfer functions used in the tone mapping based at least on the current ambient environmental conditions.

18. The system of claim 1, wherein applying tone mapping to the video data further comprises:
segmenting video frames of the video data into a plurality of regions;
for each region of the plurality of regions, dynamically selecting one or more local tone curves based at least on one or more of the characteristics of the display panel or the one or more environment metrics.

19. A method, comprising:
performing, by an encoding module implemented on a device:
receiving video data for a video from a video source;
obtaining one or more characteristics of a display panel, wherein the one or more characteristics comprise a dynamic range of the display panel;
obtaining one or more environment metrics indicating current ambient environmental conditions at and external to the display panel;
prior to encoding the video data according to a compressed video format to generate encoded video content, processing the video data to generate adapted video content adapted to the current ambient environmental conditions and the dynamic range of the display panel, said processing based at least in part on:
one or more characteristics of the video data, the one or more characteristics of the display panel including the dynamic range of the display panel, and
the one or more environment metrics indicating the current ambient environmental conditions at and external to the display panel;
wherein processing the video data comprises applying tone mapping to the video data, the tone mapping adjusted according to the dynamic range of the display panel and at least one of the one or more environment metrics to adapt luminance of the video data to the current ambient environmental conditions as indicated by the environment metrics;
encoding the adapted video content according to the compressed video format to generate the encoded video content; and providing the encoded video content to the display panel for display.

20. The method as recited in claim 19, wherein the display panel is a component of a different device than the encoding module.

21. The method as recited in claim 19, wherein processing the video data comprises applying color gamut mapping to the video data to generate video content in a color gamut of the display panel, wherein the color gamut mapping is adjusted according to at least one of the one or more environment metrics to adapt color of the video content to the current ambient environmental conditions as indicated by the environment metrics.

22. The method as recited in claim 19, wherein the one or more characteristics of the display panel include a color space and a bit depth of the display panel, and wherein processing the video data comprises mapping the video data to the color space and the bit depth of the display panel.

23. The method as recited in claim 19, wherein the video data includes high dynamic range (HDR) and wide color gamut (WCG) video data, wherein the one or more characteristics of the display panel include HDR and WCG imaging support, and wherein the adapted video content for the display panel is HDR video content in a wide color gamut rendered according to the one or more characteristics of the display panel.

24. An apparatus, comprising:
one or more computing devices configured to:
obtain one or more characteristics of a display panel, wherein the one or more characteristics comprise a dynamic range of the display panel;
obtain one or more environment metrics indicating current ambient environmental conditions at and external to the display panel;
prior to encoding video data according to a compressed video format to generate encoded video content, process input video data for the video to generate adapted video content adapted to the current ambient environmental conditions and the dynamic range of the display panel, said process based on:
one or more characteristics of the video data, the one or more characteristics of the display panel including the dynamic range of the display panel, and
the one or more environment metrics indicating the current ambient environmental conditions at and external to the display panel;
wherein to process the video data the one or more computing devices are configured to apply tone mapping to the video data, the tone mapping adjusted according to the dynamic range of the display panel and at least one of the one or more environment metrics to adapt luminance of the video data to the current ambient environmental conditions as indicated by the environment metrics;
encode the adapted video content according to the compressed video format to generate the encoded video content;
obtain and process the encoded video content to generate the adapted video content in a color space of the display panel; and
output the adapted video content to the display panel for display.

25. The apparatus as recited in claim 24, wherein the video data includes high dynamic range (HDR) and wide color gamut (WCG) video data, wherein the display panel supports HDR and WCG imaging, and wherein the encoded video content is HDR video content in a wide color gamut rendered according to the one or more characteristics of the display panel.

* * * * *

UNITED STATES PATENT AND TRADEMARK OFFICE
CERTIFICATE OF CORRECTION

PATENT NO. : 10,880,549 B2
APPLICATION NO. : 14/631398
DATED : December 29, 2020
INVENTOR(S) : Kenneth Greenebaum et al.

Page 1 of 1

It is certified that error appears in the above-identified patent and that said Letters Patent is hereby corrected as shown below:

On the Title Page

Item (74), Lines 1-2, delete "Robert C. Kowert; Kowert, Hood, Munyon, Rankin & Goetzel, P.C." and insert -- Fish & Richardson P.C. --.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*